(12) United States Patent
Zinck et al.

(10) Patent No.: US 9,972,864 B2
(45) Date of Patent: *May 15, 2018

(54) RECHARGEABLE ELECTROCHEMICAL BATTERY CELL

(71) Applicant: Alevo Research AG, Zug (CH)

(72) Inventors: Laurent Zinck, Mothern (FR);
Christian Pszolla, Karlsruhe (DE);
Christiane Ripp, Pfinztal (DE);
Markus Borck, Stuttgart (DE);
Claudia Wollfarth, Karlsruhe (DE)

(73) Assignee: ALEVO INTERNATIONAL S.A., Martigny (CH)

( * ) Notice: Subject to any disclaimer, the term of this patent is extended or adjusted under 35 U.S.C. 154(b) by 132 days.

This patent is subject to a terminal disclaimer.

(21) Appl. No.: 14/880,807

(22) Filed: Oct. 12, 2015

(65) Prior Publication Data

US 2016/0049689 A1 Feb. 18, 2016

Related U.S. Application Data

(63) Continuation of application No. 13/797,336, filed on Mar. 12, 2013, now Pat. No. 9,209,458, which is a
(Continued)

(30) Foreign Application Priority Data

Feb. 12, 2010 (EP) ..................... 10001458

(51) Int. Cl.
*H01M 4/136* (2010.01)
*H01M 10/0563* (2010.01)
(Continued)

(52) U.S. Cl.
CPC .... *H01M 10/0563* (2013.01); *D03D 15/0011* (2013.01); *H01M 2/1613* (2013.01);
(Continued)

(58) Field of Classification Search
CPC combination set(s) only.
See application file for complete search history.

(56) References Cited

U.S. PATENT DOCUMENTS

| 5,213,914 A | 5/1993 | Heitbaum et al. |
| 6,280,878 B1 | 8/2001 | Maruyama et al. |

(Continued)

FOREIGN PATENT DOCUMENTS

| CN | 1780031 A | 5/2006 |
| CN | 101212070 A | 7/2008 |

(Continued)

OTHER PUBLICATIONS

Foster et al., "New Highly Conductive Inorganic Electrolytes: The Liquid $SO_2$ Solvates Of the Alkali and Alkaline Earth Metal Tetrachloroaluminates." J. Electrochem. Soc., 135(11):2682-2686 (Nov. 1988).

(Continued)

*Primary Examiner* — Kaity Chandler
(74) *Attorney, Agent, or Firm* — Bose McKinney & Evans LLP

(57) ABSTRACT

Rechargeable lithium battery cell having a housing, a positive electrode, a negative electrode and an electrolyte containing a conductive salt, wherein the electrolyte comprises $SO_2$ and the positive electrode contains an active material in the composition $Li_xM'_yM''_z(XO_4)_aF_b$, wherein
M' is at least one metal selected from the group consisting of the elements Ti, V, Cr, Mn, Fe, Co, Ni, Cu and Zn,
M" is at least one metal selected from the group consisting of the metals of the groups II A, III A, IV A, V A, VI A, IB, IIB, IIIB, IVB, VB, VIB and VIIIB,
X is selected from the group consisting of the elements P, Si and S,
x is greater than 0,
y is greater than 0,
(Continued)

z is greater than or equal to 0,
a is greater than 0 and
b is greater than or equal to 0.

18 Claims, 15 Drawing Sheets

Related U.S. Application Data continuation-in-part of application No. 13/209,357, filed on Aug. 12, 2011, now abandoned, and a continuation-in-part of application No. 13/091,495, filed on Apr. 21, 2011, now Pat. No. 9,263,745, which is a continuation of application No. PCT/EP2011/000507, filed on Feb. 4, 2011.

(51) Int. Cl.

| | | |
|---|---|---|
| *H01M 4/485* | (2010.01) | |
| *H01M 4/80* | (2006.01) | |
| *D03D 15/00* | (2006.01) | |
| *H01M 2/16* | (2006.01) | |
| *H01M 4/58* | (2010.01) | |
| *H01M 10/0525* | (2010.01) | |
| *H01M 4/133* | (2010.01) | |
| *H01M 4/587* | (2010.01) | |
| *H01M 4/04* | (2006.01) | |
| *H01M 4/66* | (2006.01) | |
| *H01M 2/02* | (2006.01) | |
| *H01M 2/08* | (2006.01) | |
| *H01M 2/18* | (2006.01) | |
| *H01M 4/02* | (2006.01) | |

(52) U.S. Cl.
CPC ......... *H01M 4/043* (2013.01); *H01M 4/133* (2013.01); *H01M 4/136* (2013.01); *H01M 4/485* (2013.01); *H01M 4/587* (2013.01); *H01M 4/5825* (2013.01); *H01M 4/661* (2013.01); *H01M 4/80* (2013.01); *H01M 10/0525* (2013.01); *H01M 2/0275* (2013.01); *H01M 2/08* (2013.01); *H01M 2/18* (2013.01); *H01M 4/808* (2013.01); *H01M 2004/027* (2013.01); *H01M 2004/028* (2013.01); *H01M 2220/10* (2013.01); *H01M 2220/20* (2013.01); *H01M 2220/30* (2013.01); *H01M 2300/002* (2013.01); *H01M 2300/0022* (2013.01); *Y02E 60/122* (2013.01)

(56) References Cited

U.S. PATENT DOCUMENTS

| | | | |
|---|---|---|---|
| 6,455,202 B1 * | 9/2002 | Marugan | H01M 4/13 429/217 |
| 6,709,789 B1 | 3/2004 | Hambitzer et al. | |
| 6,730,441 B1 | 5/2004 | Hambitzer et al. | |
| 2002/0025477 A1 | 2/2002 | Itagaki et al. | |
| 2003/0118904 A1 * | 6/2003 | Hosokawa | H01M 4/13 429/217 |
| 2003/0157409 A1 | 8/2003 | Huang | |
| 2004/0048152 A1 | 3/2004 | Yata et al. | |
| 2004/0157129 A1 | 8/2004 | Hambitzer et al. | |
| 2004/0265695 A1 | 12/2004 | Barker et al. | |
| 2007/0065714 A1 | 3/2007 | Hambitzer et al. | |
| 2007/0172739 A1 | 7/2007 | Visco et al. | |
| 2008/0248400 A1 * | 10/2008 | Hwang | C01G 51/42 429/341 |
| 2009/0068566 A1 * | 3/2009 | Park | H01M 4/485 429/331 |
| 2009/0087748 A1 * | 4/2009 | Choi | H01M 4/621 429/231.5 |
| 2009/0280405 A1 | 11/2009 | Sannier et al. | |
| 2009/0305131 A1 * | 12/2009 | Kumar | B22F 3/1146 429/206 |
| 2010/0062341 A1 | 3/2010 | Hambitzer | |
| 2010/0209770 A1 * | 8/2010 | Lim | H01M 4/38 429/207 |
| 2010/0259224 A1 | 10/2010 | Zinck et al. | |
| 2010/0283429 A1 | 11/2010 | Ofer et al. | |
| 2010/0285352 A1 * | 11/2010 | Juzkow | H01M 2/26 429/163 |
| 2012/0148920 A1 * | 6/2012 | Song | H01M 4/131 429/221 |
| 2012/0251882 A1 * | 10/2012 | Moon | H01M 4/485 429/219 |

FOREIGN PATENT DOCUMENTS

| | | |
|---|---|---|
| DE | 3604541 C2 | 2/1989 |
| JP | 2002-535819 A | 10/2002 |
| JP | 2005-514304 A | 5/2005 |
| WO | WO 00/44061 A1 | 7/2000 |
| WO | WO 00/79631 A1 | 12/2000 |
| WO | WO 02/103827 A2 | 12/2002 |
| WO | WO 03/038930 A2 | 5/2003 |
| WO | WO 03/056646 A1 | 7/2003 |
| WO | WO 2005/031908 A2 | 4/2005 |
| WO | WO 2007/144488 A1 | 12/2007 |
| WO | WO 2008/058685 A1 | 5/2008 |
| WO | WO 2008/138132 A1 | 11/2008 |
| WO | WO 2008/147751 A1 | 12/2008 |
| WO | WO 2009/077140 A1 | 6/2009 |

OTHER PUBLICATIONS

George, "Atomic Layer Deposition: An Overview," Chem. Rev., 110(1):111-131 (2010).
Porcher et al., "Design of Aqueous Processed Thick LiFePO$_4$ Composite Electrodes for High-Energy Lithium Battery," J. Electrochem. Soc., 156(3):A133-A144 (2009).
Sundaram et al., "Leading Edge Atomic Layer Deposition Application," ECS Transactions, 16(4):19-27 (2008).
Zinck et al., "Purification process for an inorganic rechargeable lithium battery and new safety concepts," J. Applied Electrochem., 36:1291-1295 (2006).

* cited by examiner

RECHARGEABLE ELECTROCHEMICAL BATTERY CELL

RELATED APPLICATIONS

This application is a continuation of U.S. application Ser. No. 13/797,336, filed Mar. 12, 2013. U.S. application Ser. No. 13/797,336 is a continuation-in-part of U.S. application Ser. No. 13/209,357, filed Aug. 12, 2011 and is a continuation-in-part of U.S. application Ser. No. 13/091,495, filed Apr. 21, 2011, which is a continuation of International Application No. PCT/EP2011/000507, filed Feb. 4, 2011, which claims priority to European Application No. 10001458.8, filed Feb. 12, 2010. All of the aforementioned applications are hereby incorporated by reference in their entireties.

FIELD

The field relates to rechargeable lithium ion battery cells and treated electrodes for rechargeable battery cells and methods thereof.

BACKGROUND

It is well known that conventional rechargeable lithium ion battery cells have a history of safety problems. These safety problems are caused, in part, by the organic solvent electrolyte in such battery cells, which is flammable. Because of this danger, conventional rechargeable lithium ion battery cells contain components designed to activate in the event of cell failure in order to prevent combustion of the organic solvent electrolyte. However, these components lead to, for example, increased manufacturing costs and increase the volume and weight of the cell.

SUMMARY

In an embodiment, the positive electrode comprises an active material, a current collector and optionally a binder and/or conductive agent (to improve conductivity). In a further embodiment, the negative electrode comprises an active material, a current collector and optionally a binder and/or conductive material. In a further embodiment, the positive electrode and/or negative electrode are treated to reduce capacity loss due to formation of stable covering layers on the positive and negative electrodes (for example, SEI layers).

In an embodiment is provided a battery cell, comprising: a housing, a positive electrode, a negative electrode and an electrolyte, wherein the electrolyte comprises $SO_2$ and a conductive salt, wherein the positive electrode comprises a compound of the formula $Li_xM'_y(XO_4)_aF_b$ (I) as defined herein, wherein the positive electrode further comprises a current collector having a first portion comprising a porous metal which has a first and second surface and a thickness located there between and comprises a plurality of pores containing the compound that extend at least partially through the thickness, wherein at least some of the pores have void spaces accessible to the electrolyte and wherein the battery cell is a rechargeable lithium ion battery cell.

In a further embodiment is provided a battery cell, comprising: a housing, a positive electrode, a negative electrode and an electrolyte, wherein the positive electrode comprises $LiFePO_4$ which is optionally doped, wherein the electrolyte comprises $SO_2$ and a conductive salt, wherein the positive electrode further comprises a current collector having a first portion comprising a porous metal which has a first and second surface and a thickness located there between and comprises a plurality of pores containing the compound that extend through the thickness, wherein at least some of the pores have void spaces accessible to the electrolyte and wherein the battery cell is a rechargeable lithium ion battery cell.

In a further embodiment is provided a battery cell, comprising, a housing, a positive electrode, a negative electrode and an electrolyte, wherein the positive electrode comprises $LiFePO_4$ which is optionally doped, the electrolyte comprises $SO_2$ and a conductive salt, wherein the $SO_2$ is in an amount greater than 40 weight percent of the weight of the electrolyte and wherein the battery cell is a rechargeable lithium ion battery cell.

In a further embodiment is provided a battery cell comprising a housing, a positive electrode, a negative electrode and an electrolyte, wherein the positive electrode comprises $LiFePO_4$ which is optionally doped, wherein the electrolyte comprises $SO_2$ and a conductive salt, wherein organic material is in an amount less than 60 weight percent of the weight of the electrolyte and wherein the battery cell is a rechargeable lithium ion battery cell.

In a further embodiment is provided a battery cell comprising a housing, a positive electrode, a negative electrode and an electrolyte, wherein the positive electrode comprises $LiFePO_4$ which is optionally doped, wherein the electrolyte comprises $SO_2$ and a conductive salt, wherein the electrolyte comprises at least 3 moles $SO_2$ per mole of conductive salt, and wherein the battery cell is a rechargeable lithium ion battery cell.

In an embodiment, the measurements described herein are at 20 degrees C. and 1 bar.

In an embodiment is provided a rechargeable lithium battery cell comprising a housing, a positive electrode, a negative electrode and an electrolyte comprising a conductive salt, wherein the electrolyte is based on $SO_2$ and the positive electrode comprises an active material comprising the composition $LiFePO_4$ and wherein the positive electrode comprises a three dimensional porous metal current collector and the electrolyte comprises at least 2 mole $SO_2$ per mole of conductive salt.

The battery cell according to the above embodiment, wherein the positive electrode has a thickness of at least 0.3 mm.

The battery cell according to the above embodiment, wherein the positive electrode comprises a quantity of active material per unit area of from 30 $mg/cm^2$ to 140 $mg/cm^2$.

The battery cell according to the above embodiment, wherein the positive electrode is porous, the porosity of the positive electrode being from greater than 0% to no more than 50%.

The battery cell according to the above embodiment, wherein the three-dimensional porous metal current collector is a metal foam.

The battery cell according to the above embodiment, wherein the porous metal current collector extends essentially over the entire thickness of the positive electrode.

The battery cell according to the above embodiment, wherein the active material is distributed essentially homogeneously in the positive metal current collector.

The battery cell according to the above embodiment, wherein the negative electrode, comprising active material and a current collector, has a thickness of from 0.2 mm to 0.6 mm.

The battery cell according to the above embodiment, wherein the positive electrode comprises a binding agent, wherein the concentration of the binding agent is from greater than 0% to no more than 10%.

The battery cell according to the above embodiment, wherein the negative electrode comprises carbon as an active material for inserting lithium ions.

The battery cell according to the above embodiment, wherein the negative electrode comprises a quantity of active material from 10 mg/cm$^2$ to 140 mg/cm$^2$.

The battery cell according to the above embodiment, wherein the negative electrode, comprising active material and a current collector, is porous and its porosity is from greater than 0% to no more than 50%.

The battery cell according to the above embodiment, wherein the negative electrode, comprising active material, comprises a binding agent, wherein the concentration of the binding agent is from greater than 0 wt. % to no more than 5 wt. %.

The battery cell according to the above embodiment, wherein the conductive salt is a lithium tetrahalogenoaluminate.

The battery cell according to the above embodiment, wherein the cell has a current carrying capacity, per unit area of the positive electrode, of from 10 mA/cm$^2$ to 300 mA/cm$^2$.

The battery cell according to the above embodiment, wherein the active material comprises a lithium halogenide.

A method for producing an electrode for a battery cell according to the above embodiment, comprising:
producing a paste mass from the active material with optional admixture of a binding agent and/or a conductivity-improving material;
homogeneously incorporating the paste mass into a three-dimensional porous metal structure;
pressing the three-dimensional metal structure containing the paste mass in such a manner that its thickness is reduced.

The battery cell according to the above embodiment, wherein the positive electrode has a thickness of from 0.3 mm to 0.6 mm.

The battery cell according to the above embodiment, wherein the binding agent is a fluorinated binding agent.

The battery cell according to the above embodiment, wherein the binding agent is a terpolymer of tetrafluoroethylene.

The battery cell according to the above embodiment, wherein the electrolyte comprises from 2 mole SO$_2$ to 6 mole SO$_2$ per mole of conductive salt.

The battery cell according to the above embodiment, wherein the conductive salt is lithium tetrachloroaluminate.

The battery cell according to the above embodiment, wherein the cell has a current carrying capacity, per unit area of the positive electrode, of from 10 mA/cm$^2$ to 150 mA/cm$^2$.

The battery cell according to the above embodiment, wherein the active material composition of LiFePO$_4$ further comprises vanadium.

The battery cell according to the above embodiment, wherein the active material composition of LiFePO$_4$ is doped.

The battery cell according to the above embodiment, wherein the active material composition of LiFePO$_4$ is without doping.

The battery cell according to the above embodiment, wherein the negative electrode, comprising active material and a current collector, has a thickness of at least 0.2 mm.

A battery cell, comprising: a housing, a positive electrode, a negative electrode and an electrolyte, wherein the electrolyte comprises SO$_2$ and a conductive salt, wherein the positive electrode comprises a compound of the formula Li$_x$M'$_y$(XO$_4$)$_a$F$_b$ (I), which compound is optionally doped, wherein M' is at least one metal selected from the group consisting of the elements Ti, V, Cr, Mn, Fe, Co, Ni, Cu and Zn, X is selected from the group consisting of the elements P, Si and S, x is greater than 0, y is greater than 0, a is greater than 0 and b is greater than or equal to 0, wherein the sum of positive charges in the compound equals the sum of negative charges, wherein the positive electrode further comprises a current collector having a first portion comprising a porous metal which has a first and second surface and a thickness located there between and comprises a plurality of pores containing the compound that extend at least partially through the thickness, wherein at least some of the pores have void spaces accessible to the electrolyte and wherein the battery cell is a rechargeable lithium ion battery cell.

A battery cell, comprising: a housing, a positive electrode, a negative electrode and an electrolyte, wherein the positive electrode comprises LiFePO$_4$ which is optionally doped, wherein the electrolyte comprises SO$_2$ and a conductive salt, wherein the positive electrode further comprises a current collector having a first portion comprising a porous metal which has a first and second surface and a thickness located there between and comprises a plurality of pores containing the compound that extend through the thickness, wherein at least some of the pores have void spaces accessible to the electrolyte and wherein the battery cell is a rechargeable lithium ion battery cell.

A battery cell, comprising: a housing, a positive electrode, a negative electrode and an electrolyte, wherein the positive electrode comprises LiFePO$_4$ which is optionally doped, the electrolyte comprises SO$_2$ and a conductive salt, wherein the SO$_2$ is in an amount greater than 40 weight percent of the weight of the electrolyte and wherein the battery cell is a rechargeable lithium ion battery cell.

A battery cell comprising a housing, a positive electrode, a negative electrode and an electrolyte, wherein the positive electrode comprises LiFePO$_4$ which is optionally doped, wherein the electrolyte comprises SO$_2$ and a conductive salt, wherein organic material is in an amount less than 60 weight percent of the weight of the electrolyte and wherein the battery cell is a rechargeable lithium ion battery cell.

A battery cell comprising a housing, a positive electrode, a negative electrode and an electrolyte, wherein the positive electrode comprises LiFePO$_4$ which is optionally doped, wherein the electrolyte comprises SO$_2$ and a conductive salt, wherein the electrolyte comprises at least 3 moles SO$_2$ per mole of conductive salt, and wherein the battery cell is a rechargeable lithium ion battery cell.

The battery cell of an embodiment provided herein, wherein after the first 100 cycles of charging and discharging following formation, the cell discharge capacity does not decrease by more than 25 percent over the next 250 cycles, wherein the cell is charged at a current of 0.5 C until the cell potential reaches 3.6 V at which time the potential of 3.6 V is held constant until the current reaches 0.1 C, at which time the charging is stopped and after a delay of approximately 10 minutes, the cell is discharged at a current of 0.5 C and the discharging is stopped when the cell potential reaches 2.5 V, and wherein after a delay of approximately 60 minutes after the discharging is stopped, (1) and (2) are repeated for the next cycle, wherein the charge and discharge cycles are carried out at approximately 20 C and approximately 1 bar (ambient) pressure.

The battery cell of an embodiment provided herein, wherein the plurality of pores further contain a compound selected from the group consisting of a conductive agent, a binding agent, and a lithium halogenide.

The battery cell of an embodiment provided herein, wherein the plurality of pores extend through the entire thickness.

The battery cell of an embodiment provided herein, wherein the current collector further comprises a connector portion in conductive contact with the porous current collector.

The battery cell of an embodiment provided herein, wherein the positive electrode has a thickness of at least 0.25 mm.

The battery cell of an embodiment provided herein, wherein the positive electrode has a thickness of from 0.25 mm to 1.0 mm.

The battery cell of an embodiment provided herein, wherein the positive electrode comprises a quantity of active material per unit area of at least 30 mg/cm$^2$.

The battery cell of an embodiment provided herein, wherein the positive electrode comprises a quantity of active material per unit area of from 30 mg/cm$^2$ to 180 mg/cm$^2$.

The battery cell of an embodiment provided herein, wherein the positive electrode is porous and has a porosity of no more than 50%

The battery cell of an embodiment provided herein, wherein the negative electrode has a thickness of at least 0.2 mm.

The battery cell of an embodiment provided herein, wherein the negative electrode has a thickness of from 0.2 mm to 0.8 mm.

The battery cell of an embodiment provided herein, wherein the positive electrode comprises a binding agent in an amount of no more than 10 wt. % of the active material.

The battery cell of an embodiment provided herein, wherein the negative electrode comprises carbon for inserting lithium ions.

The battery cell of an embodiment provided herein, wherein the negative electrode comprises a quantity of active material of at least 10 mg/cm$^2$.

The battery cell of an embodiment provided herein, wherein the negative electrode comprises a quantity of active material per unit area of from 10 mg/cm$^2$ to 100 mg/cm$^2$.

The battery cell of an embodiment provided herein, wherein the negative electrode is porous and its porosity is no more than 50%.

The battery cell of an embodiment provided herein, wherein the negative electrode comprises a porous metal portion and binding agent contained therein and the binding agent is in an amount of no more than 5 wt. % of the weight of the porous metal portion of the negative electrode.

The battery cell of an embodiment provided herein, wherein the electrolyte comprises at least 3 moles SO$_2$ per mole of conductive salt.

The battery cell of an embodiment provided herein, wherein the electrolyte comprises from 3 to 220 moles SO$_2$ per mole of conductive salt.

The battery cell of an embodiment provided herein, wherein the conductive salt comprises lithium tetrachloroaluminate.

The battery cell of an embodiment provided herein, wherein the positive electrode has a current carrying capacity of at least 10 mA/cm$^2$.

The battery cell of an embodiment provided herein, wherein the positive electrode has an ampacity per unit area of from 10 mA/cm$^2$ to 150 mA/cm$^2$.

The battery cell of an embodiment provided herein, wherein lithium chloride is mixed with active metal of the positive electrode.

The battery cell of an embodiment provided herein, wherein the positive and/or negative electrode is treated to reduce covering layers by means of applying a surface coating to the electrode.

A method for producing a positive electrode for a lithium ion rechargeable battery, comprising:
  providing a paste mass comprising LiFePO$_4$, optionally with admixture of a binding agent or a conductivity-improving material;
  homogeneously incorporating the paste mass into a three-dimensional porous metal current collector; and
  pressing the three-dimensional metal current collector comprising the paste mass in such a manner that its thickness is reduced.

An electrode produced according to an embodiment provided herein.

The battery cell of an embodiment provided herein, wherein the electrolyte comprised therein will not ignite or combust when a battery comprising the cell is placed above a Bunsen burner and contacted with the tip of a blue flame of the Bunsen burner for at least 10 minutes.

A motor vehicle power supply, comprising the battery cell of an embodiment provided herein.

An energy storage system, comprising the battery cell of an embodiment provided herein.

DESCRIPTION

Figure 1:
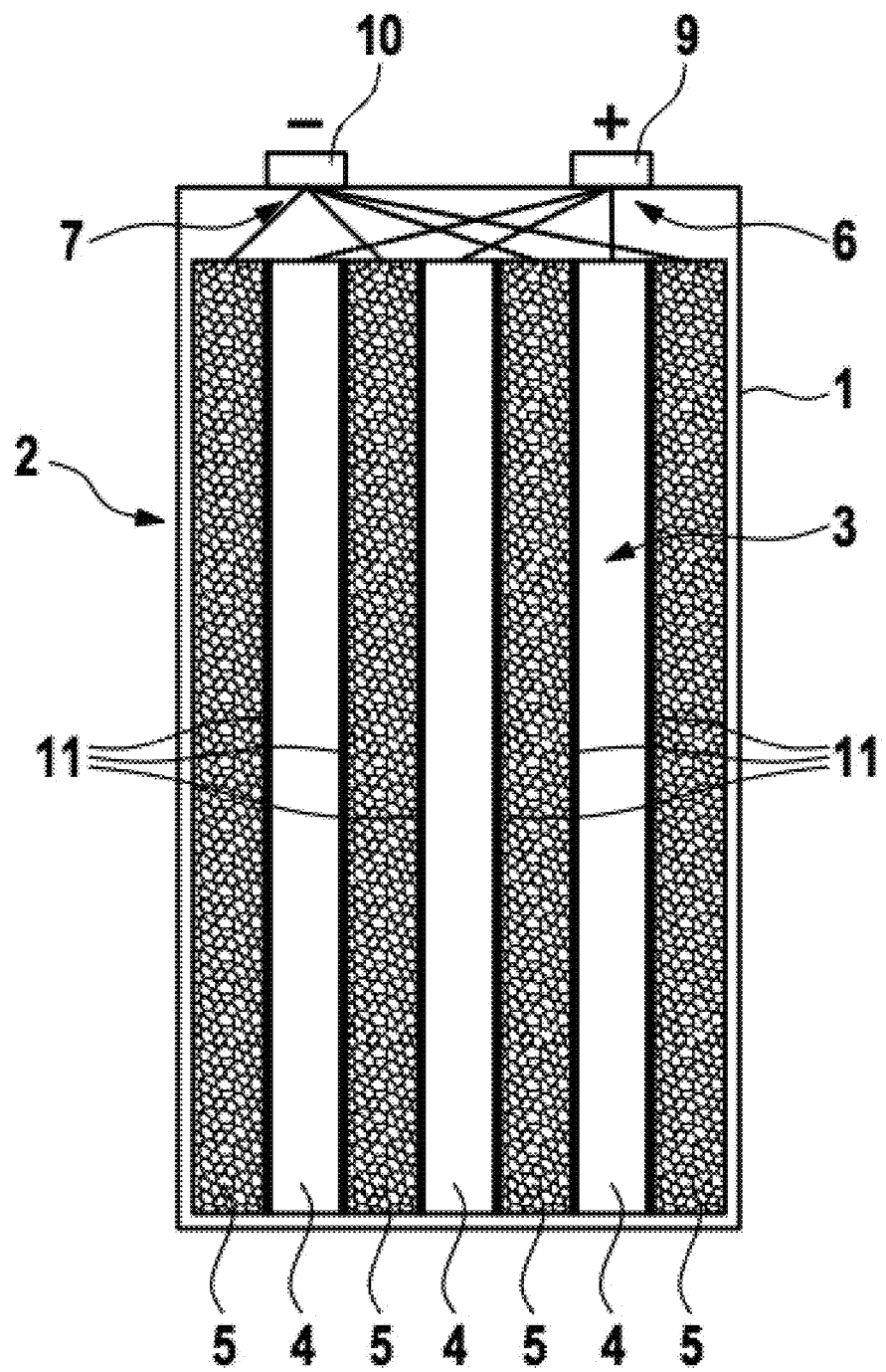
FIG. 1 shows a cross-sectional view of a battery cell embodiment.

As described below, embodiments of the described rechargeable lithium ion battery cell, comprise a positive electrode, a negative electrode, a housing and an electrolyte, where the electrolyte comprises $SO_2$ and a conductive salt and a housing.

Positive Electrode

Positive Electrode Active Material and Other Compounds

In an embodiment, the positive electrode comprises an active material compound of the formula $Li_xM'_yM''_z(XO_4)_aF_b$ (Formula I). In an embodiment M' is at least one metal selected from the group consisting of the elements Ti, V, Cr, Mn, Fe, Co, Ni, Cu and Zn. In a further embodiment M'' is at least one metal selected from the group consisting of the metals of the groups II A, III A, IV A, V A, VI A, IB, IIB, IIIB, IVB, VB, VIB and VIIIB, and such metals are, for example, doping metals. In an embodiment X is selected from the group consisting of the elements P, Si and S. In a further embodiment x is greater than 0, y is greater than 0, z is greater than or equal to 0, a is greater than 0 and b is greater than or equal to 0.

In a further embodiment, the active material comprises a phosphate, and in this case X is thus phosphorus. In a further embodiment, M' is iron. In a further embodiment, b is equal to 0 and in this case, the active material thus does not contain any fluorine.

In a further embodiment, the compound of formula $Li_xM'_yM''_z(XO_4)_aF_b$ (Formula I) is $LiFeM''_zPO_4$. In a further embodiment, the compound of formula $Li_xM'_yM''_z(XO_4)_aF_b$ (Formula I) is $LiFePO_4$.

The term "at least one metal" used in $Li_xM'_yM''_z(XO_4)_aF_b$ (Formula I) means that M' and M'' each may be two or more of the respectively defined metals. Accordingly, the recitations y and z refer to the totality of metals that are recited above, respectively, by M' and M''. As an example, where M' is two of the defined metals, in the case, for example, where the compound of the formula $Li_xM'_yM''_z(XO_4)_aF_b$ (Formula I) is $Li_1[Fe_mMn_{1-m}]_1PO_4$, then $0.0 \le m \le 1.0$, x, y and a are 1 and b and z are 0. In another aspect, where the compound of the formula $Li_xM'_yM''_z(XO_4)_aF_b$ (Formula I) is, for example, a doped $LiFePO_4$ compound, then the variables in $Li_1[Fe_{1-z}M''_z]_1PO_4$, are: $0.0 \le z \le 1.0$, x and a are 1, y is 1-z and b is 0.

In a further embodiment, where M'' is a doping metal or metals, as mentioned above, such doping metals are, for example, in an amount (each doping metal independently or the two or more doping metals in combination) less than or equal to 10 mole percent of the total number of moles of M'$_y$ in the compound of $Li_xM'_yM''_z(XO_4)_aF_b$ (Formula I).

In a another embodiment, the compound of formula $Li_xM'_yM''_z(XO_4)_aF_b$ (Formula I) is $Li_xM'_y(XO_4)_aF_b$, and the compound is optionally doped. In a further embodiment, in a doped compound of the formula $Li_xM'_y(XO_4)_aF_b$, the doped metal or metals are, for example, in an amount, (each doping metal independently or the two or more doping metals in combination) less than or equal to 10 mole percent of the total number of moles of M'$_y$ in the compound.

In a further embodiment, the doping metals are, for example, selected from the group consisting of aluminum, magnesium, niobium, zirconium and ions thereof.

In the compound of formula $Li_xM'_yM''_z(XO_4)_aF_b$ (Formula I), the condition of charge neutrality is applied. That is, the sum of positive charges of Li, M' and (when contained in the compound) M'' equal the sum of the negative charges of the $XO_4$ and (when contained in the compound) F.

Examples of commercially available positive electrode active materials are listed in Table 1 below:

TABLE 1

| Company Name | Compound | Product Name |
|---|---|---|
| Phostech Lithium Inc. | $LiFePO_4$ | Grade P1 |
| Phostech Lithium Inc. | $LiFePO_4$ | Grade P2 |
| Alees (Advanced Lithium Electrochemistry Co., Ltd.) | $LiFePO_4$ | LFP-NCO M121 |
| Alees (Advanced Lithium Electrochemistry Co., Ltd.) | $LiFePO_4$ | LFP-NCO M12 |
| Formosa Energy & Material Technology Co., Ltd. | $LiFe_xM_{(1-x)}P_yO_z$ | SFCM30050 |
| Prayon S.A. | $LiFeBPO_4$ | Lithium Boron Iron Phosphate |

In a further embodiment, the active material is in the form of particles and the mean particle size of such particles is at least 0.1 µm, at least 0.2 µm, at least 0.5 µm, at least 1 µm or at 2 µm. In a further embodiment, the mean particle size is from 0.1 µm to 2 µm, 0.1 µm to 3 µm, or 0.1 µm to 4 µm or from 0.2 µm to 2 µm, 0.2 µm to 3 µm, or 0.2 µm to 4 µm.

In a further embodiment, active material particles are coated with, for example, with carbon or carbon containing materials, to, for example, increase conductivity.

In a further embodiment, the positive electrode comprises a conductive agent compound, for example, carbon black or other carbon containing materials, to improve the conductivity of the active material. For example, in an embodiment, the active material is admixed with such conductive agents.

In a further embodiment, the positive electrode optionally comprises a binding agent compound, for example the active material is admixed with a binding agent. In an embodiment, the binding agent is selected from the group consisting of: a fluorinated binding agent, THV (terpolymer of tetrafluoroethylene, hexafluoropropylene and vinylidene fluoride) and PVDF (polyvinylidene fluoride).

In a further embodiment, to increase, for example, cell cycling stability, the positive electrode optionally comprises a lithium halogenide compound. For example, in an embodiment, the active material is admixed with a lithium halogenide. In an embodiment, the lithium halogenide is lithium chloride.

In a further embodiment, in addition to the above described active material, the positive electrode optionally comprises a compound selected from the group consisting of a conductive agent, a binding agent, and a lithium halogenide, as described above, for example, in admixture with the active material.

Positive Electrode Porous Metal Current Collector

Figure 4:
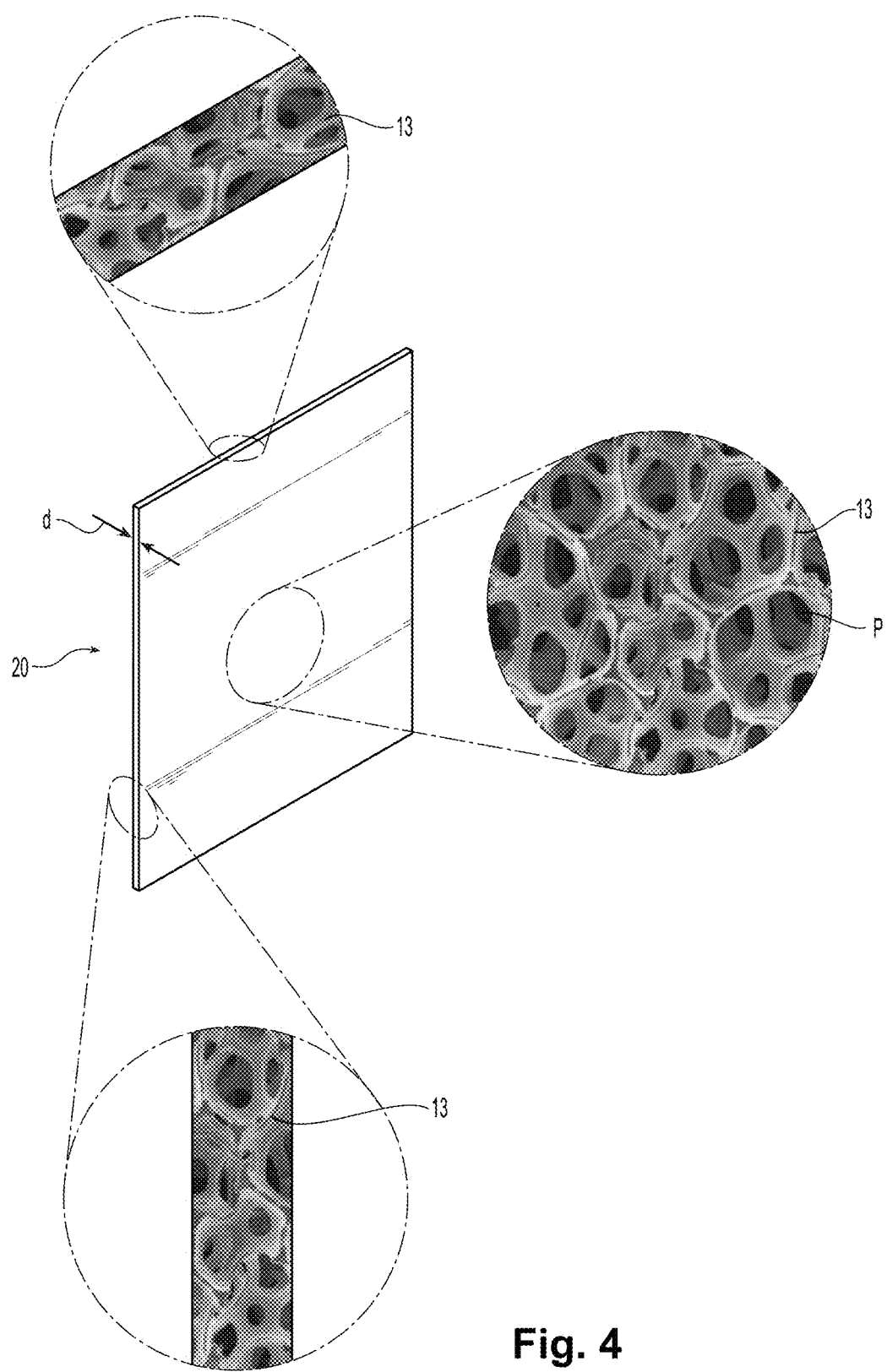
FIG. 4 shows a view of a porous metal current collector embodiment.

In an embodiment, the positive electrode contains a current collector which in whole or in part comprises a porous metal. In an embodiment, the porous metal 20 has a first and second surface (for example, a front and a back surface as shown in FIG. 4) and a thickness d between the first and second surface.

In an embodiment, the porous metal comprises a plurality of pores P that are defined by the porous metal structure 13. As shown in FIG. 4, in an embodiment, the pores P extend through the entire thickness and surfaces of the porous metal 20.

Figure 2:
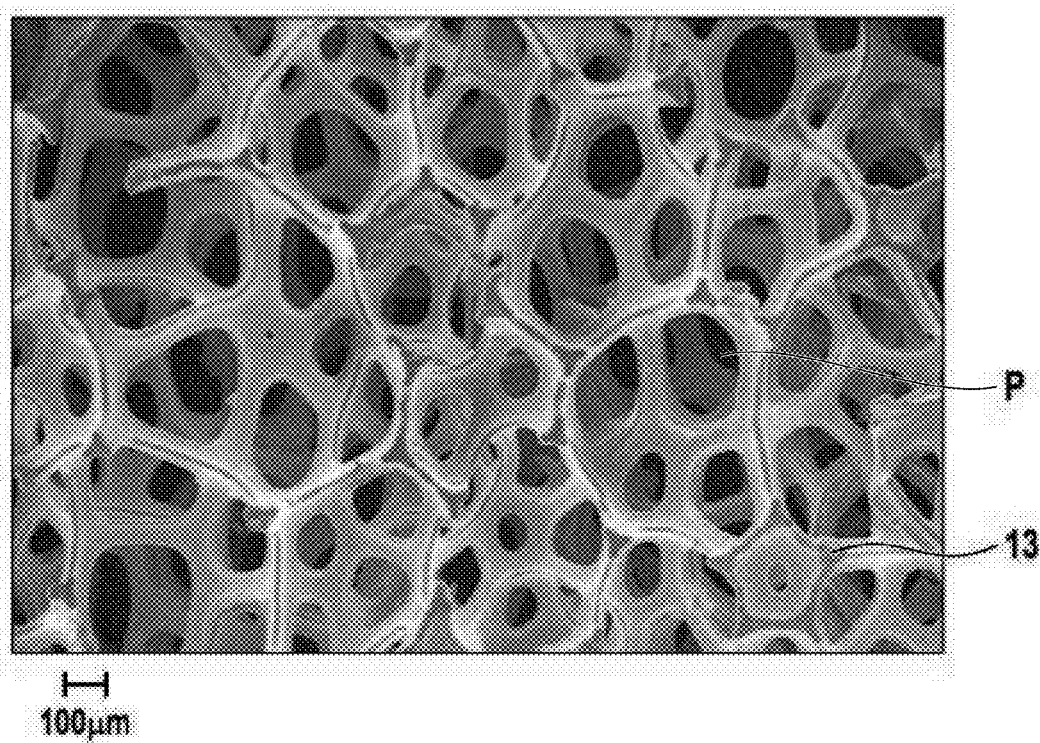
FIG. 2 shows a cross-sectional view of a metal foam embodiment.

In a further embodiment, the porous metal 20 is a reticulated metal with the reticulated metal structure defining the pores. In a further embodiment, the porous metal 20 is, for example, a metal foam, metal fleece, metal mesh or metal fabric. In a further embodiment, the metal is, for example, nickel or copper metal. An electron microscope image of a porous nickel metal foam embodiment is shown in FIG. 2 and in the insets shown in FIG. 4.

In an embodiment, the pores of the porous metal extend at least partially through the porous metal thickness d. In a further embodiment, the pores of the porous metal extend from at least one surface of the porous metal through at least 50 percent, at least 60 percent, at least 70 percent, at least 80 percent or at least 90 percent of the porous metal thickness d. In a further embodiment, the porous metal comprises at least 50 percent, at least 60 percent, at least 70 percent, at least 80 percent or at least 90 percent of the positive electrode thickness d.

In a further embodiment, the porous metal comprises at least 50 percent, at least 60 percent, at least 70 percent, at least 80 percent or at least 90 percent of the current collector exterior surfaces. In a further embodiment, the porous metal comprises at least 50 percent, at least 60 percent, at least 70 percent, at least 80 percent or at least 90 percent of the positive electrode exterior surfaces.

Exemplifications of commercially available porous metal foam embodiments of are listed below in Table 2.

TABLE 2

| Company Name | Material | Density (g/m$^2$) | Pore size (µm) | Thickness (mm) |
|---|---|---|---|---|
| Storck | nickel | 380.00 | — | 1.30 |
| Nitech | nickel | 350.00 | — | 1.30 |
| Inco | nickel | 380.00 | 560.00 | 1.70 |
| Inco | nickel | 380.00 | 580.00 | 1.70 |
| Inco | nickel | 480.00 | 580.00 | 1.70 |
| Inco | nickel | 880.00 | — | 0.36 |
| Inco | nickel | 1100.00 | — | 0.36 |
| Alantum | copper | 430.00 | 580.00 | 1.70 |
| Alantum | copper | 480.00 | 580.00 | 1.70 |
| Alantum | copper | 350.00 | 580.00 | 1.70 |
| Changsha Lyrun | copper | 480.00 | 95 ppi | 1.70 |
| Changsha Lyrun | nickel | 480.00 | 95 ppi | 1.70 |
| Changsha Lyrun | copper | 400.00 | 120 ppi | 1.70 |
| Changsha Lyrun | nickel | 480.00 | 120 ppi | 1.70 |

Figure 3:
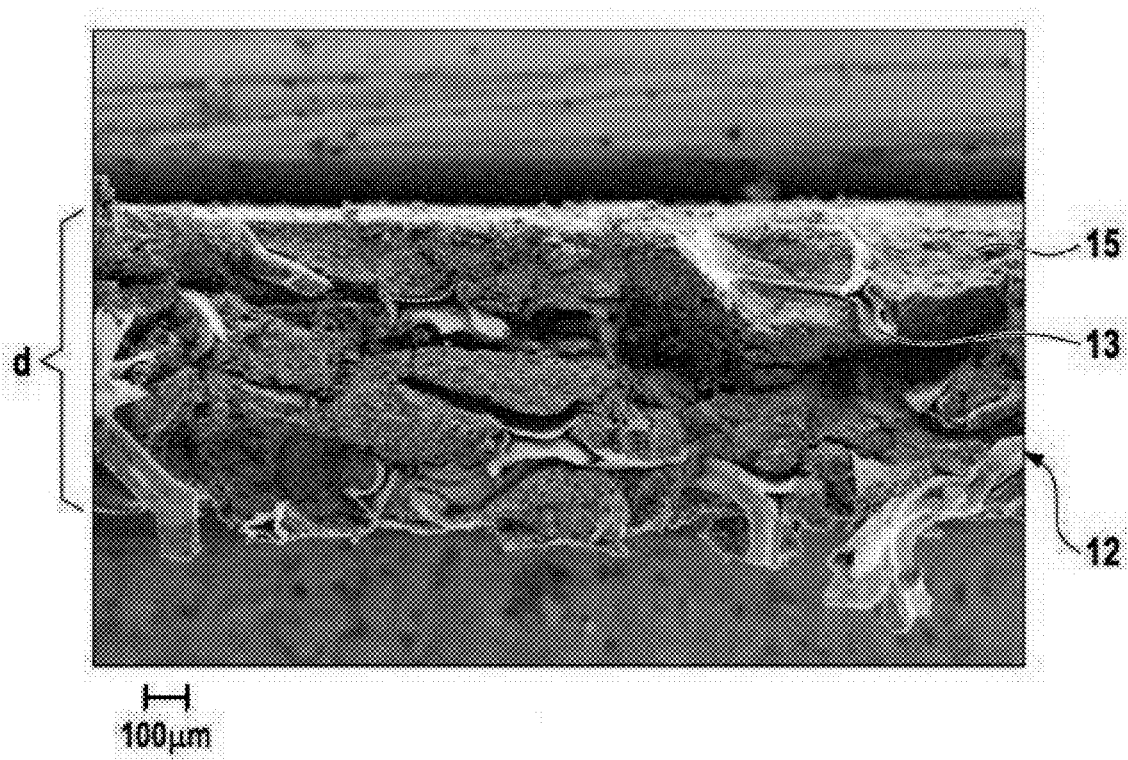
FIG. 3 shows a cross-sectional view of a portion of a positive electrode embodiment.
Figure 5:
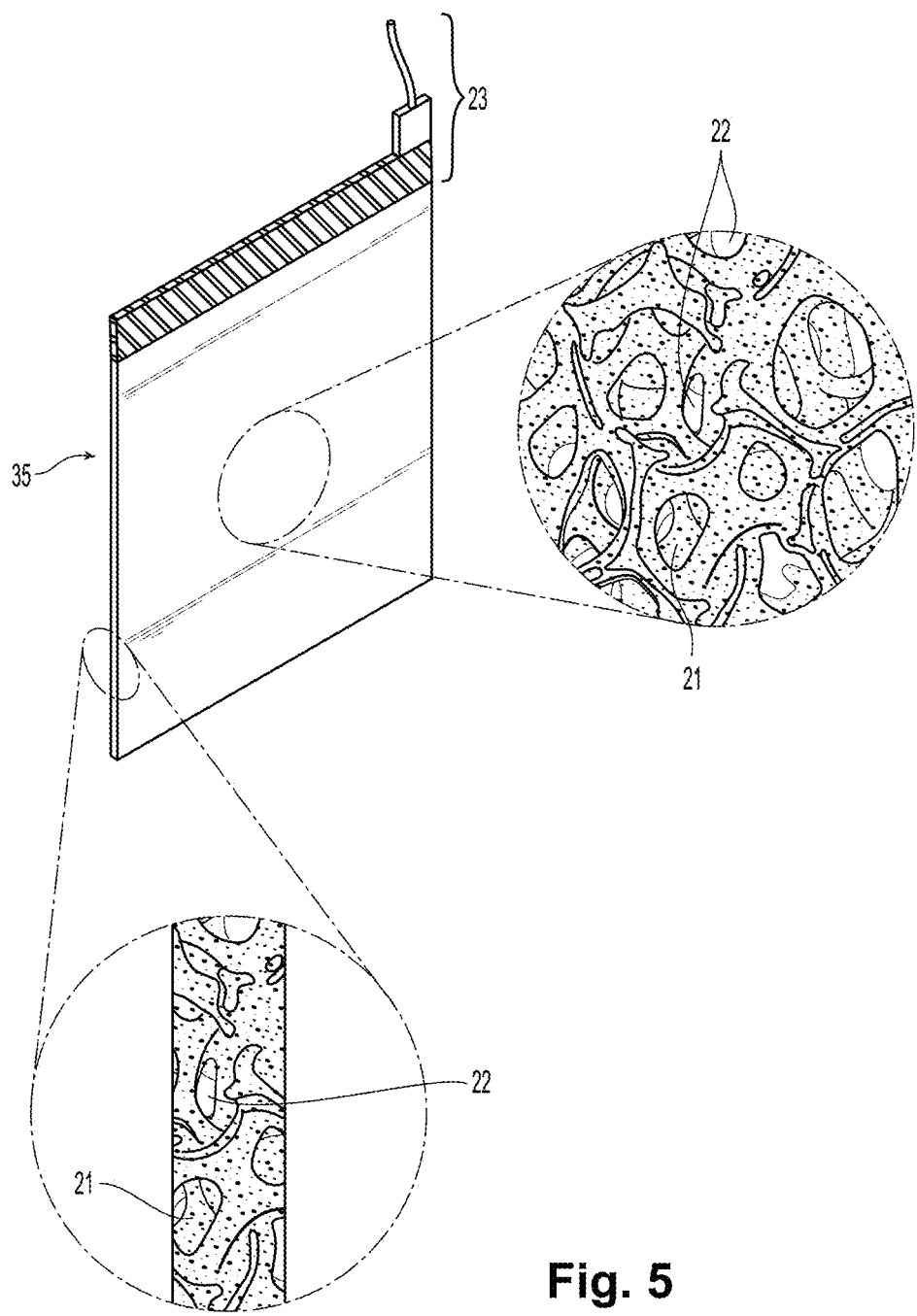
FIG. 5 shows a view of an electrode embodiment and a schematic representation of the porous metal current collector portion of the electrode filled with active material.

Positive Electrode Porous Metal Current Collector Containing Active Material and Other Compounds In a further embodiment, the pores P of the porous metal 20 contain active material and optionally the other compounds discussed above. FIG. 3 shows an electron microscope image of the porous metal current collector portion of a positive electrode, having a thickness d and containing active material 15 in pores defined by the porous metal structure 13. In FIG. 5, in the insets, are schematic representations of the pores of the porous metal containing active material and optionally other compounds as described above 21. The schematic insets of FIG. 5 also show void spaces 22 that are defined by the active material contained in the pores and are accessible to the cell electrolyte. That is, in an embodiment, the active material and optionally the other compounds as described above fill pores P by, for example, adhering to the porous metal structure 13 that defines the pores; however, the active material and optionally the other compounds as described above do not completely occlude the pores P and instead partially occlude at least some of the pores P thereby defining void spaces 22 that are accessible to the cell electrolyte.

As noted above, the void spaces 22 shown in FIG. 5 are only a schematic representation and do not correspond to the actual size or the precise configuration of embodiments of the void spaces. For example, in an embodiment, as set forth herein, the average pore size is 580 micrometers and the average pore size of void spaces contained in a porous metal filled with active material is from 50 to 80 nanometers.

The result of this embodiment is that, due to the pores in the above-described current collector, the average distance of the active material to the current collector metal is decreased as compared to active material adhered to a planar current collector metal foil.

In an embodiment, the active material and optionally the other compounds discussed above, are applied (e.g., homogenously) to the porous metal and excess compounds are removed from the surface(s) of the porous metal. The porous metal containing the compounds is then pressed. In an embodiment, the thickness of the filled porous metal (e.g., after pressing) is no more than 50 percent or no more than 40 percent of the initial thickness of the porous metal starting material.

In an embodiment, the active material and optionally the other compounds are in an admixture. In a further embodiment, conductive agent is in an amount less than ten weight percent, less than seven weight percent, less than five weight percent or less than two weight percent of the weight of the porous metal portion of the electrode. In a further embodiment, binding agent is in an amount less than five weight percent or less than two weight percent of the weight of the weight of the porous metal portion of the electrode.

Herein, the term weight percent (wt. %) as applied to a component of a composition refers to the weight of that component divided by the total weight of the composition, expressed as a percentage. For example, as applied to the above paragraph, if a solid composition is a mixture of W grams active material, X grams binding agent and Y grams conductive agent in Z grams of nickel foam, then the wt. % of binding agent is given by:

$$\frac{X}{W+X+Y+Z} \times 100.$$

Thus, as used herein, the description that "the binding agent is in an amount less than ten weight percent of the weight of the porous metal portion of the electrode" means that if the total weight of the porous metal portion of the electrode is 100 g, then the total weight of the binding agent contained therein is less than 10 g.

As an additional example, in the context of a liquid composition, for example, an electrolyte comprising $SO_2$, a conductive salt(s), and an organic co-solvent, the description that the organic material is in an amount less than 60 weight percent of the weight of the electrolyte means that if the total weight of the electrolyte (that is the total weight in grams of the $SO_2$, conductive salt and organic solvent) is 100 g then the weight of the organic co-solvent is less than 60 g.

Moreover, it will be understood that when a liquid electrolyte composition containing $SO_2$ is used in a sealed battery cell housing, the $SO_2$ may be in an equilibrium between the liquid and gas phase and the relative amounts of gas and liquid phase $SO_2$ may vary depending on the ambient conditions. As used herein the weight percent of a component of the liquid electrolyte composition is calculated taking into consideration the total of the liquid and gas phase $SO_2$. Thus, the weight percent may be determined using either (i) the weights (typically in grams) of $SO_2$, conductive salt and organic solvent that were admixed to create the electrolyte or (ii) may be calculated based on an analysis of the electrolyte components in the housing, for example, by opening the battery cell housing in an atmosphere of inert gas under pressure and measuring the molecular content of the gas and liquid contained therein. It is further understood that the term "electrolyte" herein refers to an electrolyte admixture, with the meaning that, where some of the $SO_2$ is in a gas form and therefore is not functioning as an electrolyte (in that, it is not involved in conductivity of lithium ions), the $SO_2$ is still to be considered as part of the electrolyte admixture and therefore the amount of $SO_2$ in the "electrolyte" as applied to a sealed battery cell refers to the total amount of $SO_2$ therein whether in liquid or gaseous form.

In a further embodiment, the porous metal current collector comprising (for example, filled with) the active material and optionally the other compounds discussed above, has the following ranges of porosity, loading, thickness and pore size. In a further embodiment, in the below ranges, the porosity, thickness and pore sizes are based on (but not limited to) a porous metal current collector comprising active material ($LiFePO_4$), conductive agent (carbon black) and binding agent (THV) and the loading is based on (but not limited to) the mass of active material (mg) ($LiFePO_4$) per unit area ($cm^2$) of the porous metal current collector containing active material, conductive agent and binding agent. In a further embodiment, the porosity listed in the ranges below, is measured, for example, by mercury intrusion porosimetry.

The following are with respect, for example, to high energy cell embodiments. With regard to porosity, in embodiments, the porosity is from 25-30 percent, 20 to 30 percent or from 20 to 50 percent. With regard to loading, in embodiments, loading is from 110 to 115 mg/$cm^2$, 90 to 180 mg/$cm^2$ and 20 to 180 mg/$cm^2$. With regard to thickness, in embodiments, thickness is from 575 to 585 μm, 450 to 800 μm and 250 to 800 μm.

The following are with respect, for example, to high power cell embodiments. With regard to porosity, in embodiments, the porosity is from 33 to 37 percent, 30 to 50 percent and 20 to 50 percent. With regard to loading, in embodiments, loading is from 70 to 75 mg/$cm^2$, 20 to 90 mg/$cm^2$ and 20 to 180 mg/$cm^2$. With regard to thickness, in embodiments, thickness is from 445 to 455 μm, 250 to 500 μm and 250 to 600 μm.

In a further embodiment, the average pore size of the pores containing the compounds is from 50-80 μm.

In a further embodiment, the porosity is no more than 50 percent, no more than 50 percent, 45 percent, 40 percent, 35 percent, 30 percent, 25 percent or 20 percent. In a further embodiment, thickness is at least 0.25 mm, at least 0.3 mm, at least 0.4 mm, at least 0.5 mm or at least 0.6 mm. In a further embodiment, loading is at least 30 mg/$cm^2$, at least 40 mg/$cm^2$, at least 60 mg/$cm^2$, at least 80 mg/$cm^2$, at least 100 mg/$cm^2$, at least 120 mg/$cm^2$ or at least 140 mg/$cm^2$.

In a further embodiment, thickness is from 0.20 mm to 1.0 mm.

In a further embodiment, the current collector comprises a second portion, namely a connector which is electrically conductively connected to the porous metal. In this embodiment, the connector and the porous metal comprising the active material, and optionally the other compounds described above, comprise the electrode 35 as shown in FIG. 5.

In a further embodiment, the connector comprises a metal foil folded over an edge of the porous metal. In a further embodiment, the connector comprises a metal foil band folded over the top edge of the porous metal. In a further embodiment, a metal foil tab is attached to the band. In a further embodiment 23, a metal foil band is folded over the top edge of the porous metal, a metal foil tab is attached to the band and one or more wires are attached to the tab. In a further embodiment, the foil and wire comprise nickel metal.

Negative Electrode Active Material and Other Compounds

In an embodiment, the negative electrode comprises an active material graphite compound or another form of carbon compound that is suitable for intercalating lithium ions as is understood by the skilled artisan.

A listing of embodiments of commercially available graphite active material is shown below in Table 3.

TABLE 3

| Company Name | Product Name |
| --- | --- |
| Timcal | SFG6 |
| Timcal | SFG44 |
| Timcal | KS4 |
| Timcal | SLP50 |
| Timcal | SLP30 |
| Timcal | E-SLG5 - 07/04 |
| Timcal | E-SLX 50 - 032 |
| Timcal | SFG150 |
| Timcal | KS150 |
| Carbonix | TX25 |
| Carbonix | TX20L |
| Kropfmuhl | Graphit SGB 25L/99.9 |
| Kropfmuhl | Graphit SGB 20L/99.9 |
| Kropfmuhl | Graphit SGB 10L/99.9 |
| Aschland Südchemie | MCMB 6-28 |
| Aschland Südchemie | MCMB 10-28 |
| Aschland Südchemie | MCMB 25-28 |
| LICO | LPG320 - potato Graphite |

In a further embodiment, the negative electrode optionally comprises a binding agent compound, for example the active material is admixed with a binding agent, with the binding agent being selected from the group of binding agents described above with respect to the positive electrode. In a further embodiment, the binding agent is in an amount no more than five weight percent, three weight percent or one weight percent of the weight of the porous metal portion of the electrode.

Negative Electrode Porous Metal Current Collector

In an embodiment, the negative electrode contains a current collector which in whole or in part comprises a porous metal. In an embodiment, the porous metal current collector portion of the negative electrode is as described above with respect to the positive electrode.

Negative Electrode Porous Metal Current Collector Containing Active Material and Optionally Binder In an embodiment, the porous metal current collector containing active material and optionally binder (for example, in admixture) is as described above with respect to the positive electrode porous metal current collector containing active material and optionally other compounds.

In a further embodiment, the porous metal current collector comprising (for example, filled with) active material and optionally binding agent has the following ranges of porosity, loading, thickness and pore size. In a further embodiment, in the below ranges, the porosity, thickness and pore sizes are based on (but not limited to) a porous metal current collector comprising graphite active material and not containing a binding agent or a conductive agent and the loading is based on (but not limited to) the mass of graphite active material (mg) per unit area ($cm^2$) of the porous metal current collector containing the active material. In a further embodiment, the porosity listed in the ranges below, is measured, for example, by mercury intrusion porosimetry.

The following are with respect, for example, to high energy cell embodiments. With regard to porosity, in embodiments, the porosity is from 30-35 percent, 30-40 percent or from 30-50 percent. With regard to loading, in embodiments, loading is from 45-50 $mg/cm^2$, 25–55 $mg/cm^2$ and 10-100 $mg/cm^2$. With regard to thickness, in embodiments, thickness is from 390-410 μm, 300-500 μm and 200-800 μm.

The following are with respect, for example, to high power cell embodiments. With regard to porosity, in embodiments, the porosity is from 43-47 percent, 40-50 percent and 30-50 percent. With regard to loading, in embodiments, loading is from 25-30 $mg/cm^2$, 15–35 $mg/cm^2$ and 10-100 $mg/cm^2$. With regard to thickness, in embodiments, thickness is from 315-325 μm, 200-400 μm and 200-600 μm.

In a further embodiment, the average pore size of the pores containing the active material and optionally the binder is from 50-90 μm.

In a further embodiment, the porosity is no more than 50 percent, 45 percent, 40 percent, 35 percent or 30 percent. In a further embodiment, thickness is at least 0.2 mm, at least 0.3 mm, at least 0.4 mm, at least 0.5 mm or at least 0.6 mm. In a further embodiment, loading is at least 10 $mg/cm^2$, at least 20 $mg/cm^2$, at least 40 $mg/cm^2$, at least 60 $mg/cm^2$, at least 80 $mg/cm^2$ or at least 100 $mg/cm^2$.

In a further embodiment, thickness is from 0.20 mm to 1.0 mm.

In a further embodiment, the current collector comprises a second portion, namely a connector which is electrically conductively connected to the porous metal. In this embodiment, the connector and the porous metal comprising the active material, and optionally the other compounds described above, comprise the electrode 35 as shown in FIG. 5.

In a further embodiment, the connector comprises a metal foil folded over an edge of the porous metal. In a further embodiment, the connector comprises a metal foil band folded over the top edge of the porous metal. In a further embodiment, a metal foil tab is attached to the band. In a further embodiment 23, a metal foil band is folded over the top edge of the porous metal, a metal foil tab is attached to the band and one or more wires are attached to the tab. In a further embodiment, the foil and wire comprise nickel metal.

Electrolyte

In an embodiment, the electrolyte comprises $SO_2$ and a conductive salt and in a further embodiment is non-aqueous.

Regarding the conductive salt, in an embodiment, the conductive salt is selected from the group consisting of aluminates, halogenides, oxalates, borates, phosphates, arsenates and gallates of an alkali metal or alkaline earth metal. In a further embodiment, the conductive salt is lithium tetrahalogenoaluminate. In yet a further embodiment, the conductive salt is lithium tetrachloroaluminate.

In a further embodiment, $SO_2$ is in an amount greater than 30 weight percent, greater than 40 weight percent, greater than 50 weight percent, greater than 60 weight percent, greater than 70 weight percent, greater than 80 weight percent, greater than 85 weight percent, or greater than 90 weight percent of the weight of the electrolyte.

In a further embodiment, in addition to $SO_2$, the electrolyte may comprise one or more additional inorganic solvents, for example, sulfuryl chloride or thionyl chloride.

In a further embodiment, the electrolyte may contain organic material, for example, one or more organic co-solvents. In such an embodiment, the organic material is in an amount less than 50 weight percent, less than 40 weight percent, less than 30 weight percent, less than 20 weight percent, less than 15 weight percent, less than 10 weight percent, less than 5 weight percent, or less than 1 weight percent of the weight of the electrolyte. In a further embodiment, the electrolyte is essentially free of organic material; that is, the electrolyte contains organic material as an impurity only (for example an impurity resulting from carbon coating on the positive electrode active material or from other carbon material in the electrodes, e.g., carbon black in the positive electrode or graphite in the negative electrode) not an additive. In a further embodiment, the electrolyte contains no more than 500 parts per million organic material. In a further embodiment, the organic material contained in the electrolyte has a flash point below 200° C., 150° C., 100° C., 50° C., 25° C. or 10° C. In a further embodiment, where the electrolyte contains (or is admixed with) two or more organic materials, the combined organic materials have an average (calculated, for example, by weight percent) flash point below 200° C., 150° C., 100° C., 50° C., 25° C. or 10° C.

In a further embodiment, nitriles (for example, mononitriles or dinitriles) are in an amount less than 50 weight percent, less than 40 weight percent, less than 30 weight percent, less than 20 weight percent, less than 15 weight percent, less than 10 weight percent, less than 5 weight percent, or less than 1 weight percent of the weight of the electrolyte.

In a further embodiment, conductive salt is in an amount less than 70 weight percent, less than 60 weight percent, less than 50 weight percent, less than 40 weight percent, less than 30 weight percent, less than 20 weight percent or less than 10 weight percent of the weight of the electrolyte.

In a further embodiment, $SO_2$ plus conductive salt is in an amount greater than 50 weight percent, greater than 60 weight percent, greater than 70 weight percent, greater than 80 weight percent, greater than 85 weight percent, greater than 90 weight percent, greater than 95 weight percent or greater than 99 weight percent of the weight of the electrolyte. In a further embodiment, the electrolyte consists essentially of $SO_2$ and conductive salt. That is, other than $SO_2$ and conductive salt, the electrolyte contains less than one weight percent of other materials.

It is understood that included in this description is the combination of any two or more of the above weight percentages. Moreover, this description in the previous sentence does not detract from the fact that it is to be understood that embodiments herein also include any of the embodiments mentioned herein combined with any other one or more embodiments herein mentioned.

In an embodiment, the electrolyte comprises at least 2.0 moles $SO_2$ per mole of conductive salt. In a further embodiment, the electrolyte comprises at least 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, or 20 moles $SO_2$ per mole of conductive salt.

In a further embodiment, the electrolyte comprises from 2, 2.5, 3, 3.5, 4, 4.5, 5, 5.5, 6, 6.5, 7, 7.5, or 8 moles $SO_2$ per mole of conductive salt to 20, 25, 30, 35, 50, 100, 150, 200, or 220 moles $SO_2$ per mole of conductive salt.

In a further aspect, the maximum ratio of the moles of $SO_2$ per mole of conductive salt is set by (1) the desired safety parameters of the cell or (2) the desired levels of electrolyte ionic conductivity of the cell.

In a further embodiment, the electrolyte is synthesized according to the process set forth in either of Tables 4 and 5 below. The processes set forth in Tables 4 and 5 are carried out in an inert gas (argon), at room temperature and unless otherwise stated at ambient pressure (1 bar).

TABLE 4

| | |
|---|---|
| Drying | Drying of lithium chloride<br>3 days/120° C./vacuum<br>Drying of aluminum particles<br>2 days/450° C./vacuum |
| Mixing | LiCl 434 g (10.3 mole) (42 g/mole)<br>$AlCl_3$ 1300 g (9.7 mole) (134 g/mole)<br>Al 100 g (3.4 mole) (29 g/mole)<br>Mix well 1 mole $AlCl_3$ to 1.06 mole LiCl to 0.35 mole Al in glass flask with an opening to permit the escape of gas. |
| Melting | 250° C. for 2 hours<br>350° C. for 2 hours<br>500° C. for 2 hours<br>After 6 hours, the opening in the flask is closed.<br>500° C. for 3 days |
| Filtering | Cooling to 250° C.<br>Filter through a glass fiber cloth. |
| Introduction to $SO_2$ gas | The next day the melt is cooled to room temperature.<br>The flask with the melt is evacuated and $SO_2$ is introduced up to a desired amount, to obtain a desired mole ratio of $SO_2$ per mole of $LiAlCl_4$, from a container containing the $SO_2$ under pressure. The flask is cooled while gas is introduced. The salt melt is dissolved in the $SO_2$ and the liquid electrolyte is obtained. |

TABLE 5

| | |
|---|---|
| Drying | Drying of lithium chloride at 750° C. |
| Mixing | LiCl 434 g (10.3 mole) (42 g/mole)<br>$AlCl_3$ 1300 g (9.7 mole) (134 g/mole)<br>Mix 1 mole $AlCl_3$ to 1.06 mole LiCl in a glass flask with an opening to permit the introduction of $SO_2$. |
| Introduction of $SO_2$ gas | The flask is evacuated. Next, the desired amount of $SO_2$ is introduced with an over pressure of 1.5 bar (by "over pressure" it is meant 1.5 bar over the ambient 1 bar argon pressure), while stirring the salt mixture. When the salt begins to dissolve in the $SO_2$, the pressure of the $SO_2$ is reduced to an over pressure of 0.5 bar in order to slow the process to permit obtaining a liquid electrolyte having a desired molar ratio of $SO_2$ to $LiAlCl_4$ salt. |

Other embodiments for producing the electrolyte described herein are found, for example, in Foster, et al., "New Highly Conductive Inorganic Electrolytes—The Liquid S02 Solvates of the Alkali and Alkaline Earth Metal Tetrachloroaluminates," *J. Electrochem. Soc.*, 135: 2682-2686 (1988) and Koslowski, "Röntgenographische und schwingungsspektroskopische Untersuchungen an Solvaten des Typs MAlCl4/SO2 (M=Li,Na) und deren Wechselwirkungen mit Aromaten," Doctoral Thesis, University of Hannover/Germany (1980).

Properties of the Cell and its Components

In an embodiment, the electrolyte has, at room temperature, an ionic conductivity of 70 millisiemens/cm.

In a further embodiment, the cells described herein have thick electrodes (ranges of thickness are set forth above) due to, inter alia, (without being bound by this theory) the ionic conductivity of the electrolytes described herein. The electrode thickness described herein is also provided due to, inter alia, (without being bound by this theory) the porous metal current collector portions described herein which permits access of the electrolyte and active material, for example, throughout the interior of the porous current collector structure. Such thick electrodes permit, for example, decreased manufacturing costs (that is, less electrodes may be used per cell).

Also provided, inter alia, by embodiments of the electrolytes described herein is cell cycle stability, for example, a stable internal resistance of embodiments of the battery cells described herein over multiple cycles. Without being bound by this theory, it is believed that this stability results, inter alia, from the formation of stable electrode covering layers resulting from the chemical interaction of the electrolytes and electrodes described herein.

Moreover, in an embodiment, the battery cells described herein, have cell cycle stability (for example, the cell discharge capacity is substantially constant) over numerous cycles.

In an embodiment, after the first 100 cycles following formation, the cell discharge capacity does not decrease by more than 25% over the next 250 cycle increment. In a further embodiment, after 100 cycles following formation, the discharge capacity will not decrease by more than 25%, 20%, 15%, 10%, 5%, 1.5% or 1% over the next 250 cycle increment.

In a further embodiment, the percent loss of discharge capacity is calculated by comparing the discharge capacity at a given number of cycles (for example, at 100 cycles following formation as described above) to the discharge capacity after a given number of additional cycles (for example, an increment of 250 cycles as described above). For example, for the first increment in the example of the foregoing sentence, if the discharge capacity at 100 cycles is 100 mAh and is 90 mAh at 350 cycles, then the percent loss of discharge capacity would by 10%. Furthermore, the percent loss of discharge capacity can be measured at any number of further increments of 250 cycles. Accordingly, in the above example, the discharge capacity can be measured again at 600 cycles and the percent loss of discharge is calculated based on the difference between the discharge capacity at 350 cycles versus the discharge capacity at 600 cycles.

Figure 17:
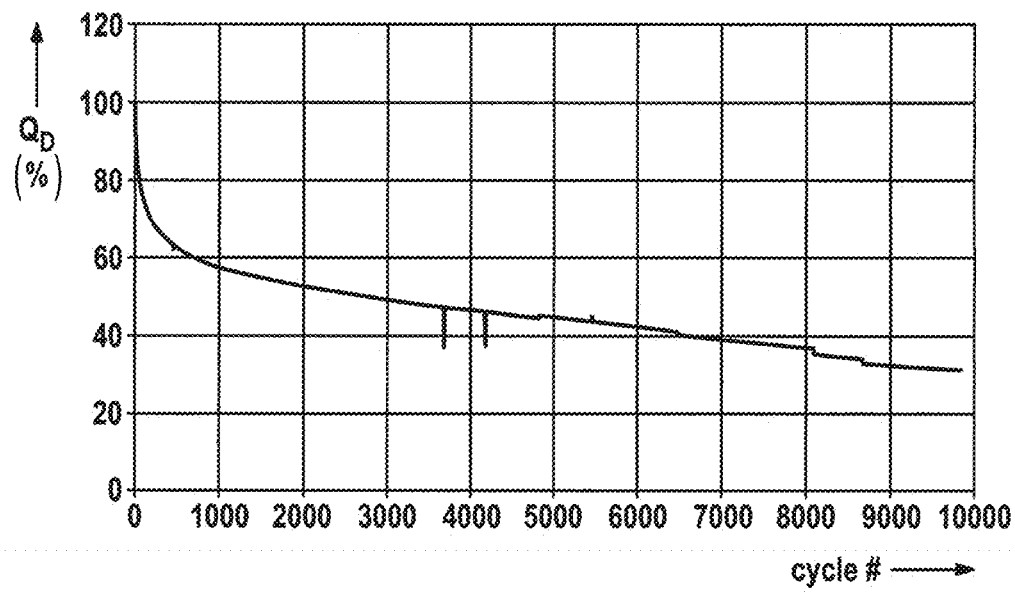
FIG. 17 shows the dependence of the capacity on the number of cycles for a long-duration experiment.

In a further embodiment, referring to FIG. 17, the percent loss of discharge capacity over 100 cycle increments, beginning at 100 cycles after formation and with the last increment ending at approximately 9,700 cycles is an average of 0.79%. In a further embodiment, referring to FIG. 17, the percent loss of discharge capacity over 100 cycle increments, beginning at 100 cycles after formation and with the last increment ending at approximately 2,900 cycles is an average of 0.89%.

In a further embodiment, the percent loss of discharge capacity over 100 cycle increments, beginning at 100 cycles after formation, is at set forth in any of the 100 cycle increments shown in Table 10 or any combination such increments.

In a further embodiment, the foregoing charge/discharge cycles are carried out as follows for each cycle: (1) charging is carried out according to the constant current constant voltage (CCCV) method with charging, for example, at 0.5 C until the cell potential reaches 3.6 volts at which time this potential is held constant until the current reaches 0.1 C, at which time charging is stopped and after a break of approximately 10 minutes, (2) discharging is carried out at 0.5 C and is stopped when the cell potential reaches 2.5 volts. Approximately 60 minutes after step (2) is completed, the foregoing is repeated for the next cycle. The charge/discharge cycles are carried out at approximately 20 C and approximately 1 bar (ambient) pressure.

In a further embodiment, the capacity, in embodiments of the battery cell described herein, per unit area of the positive electrode is at least 5 mAh/cm$^2$, at least 7.5 mAh/cm$^2$, at least 10 mAh/cm$^2$, at least 12.5 mAh/cm$^2$, at least 15 mAh/cm$^2$, at least 20 mAh/cm$^2$ or at least 25 mAh/cm.$^2$ In a further embodiment, the capacity is from at least 5 mAh/cm$^2$ to 25 mAh/cm.$^2$ In a further embodiment, more than 90 percent of the theoretical capacity of the active material in the positive electrode is obtained in the cell.

In a further embodiment, the ampacity, in embodiments of the battery cell described herein, per unit area of the positive electrode is at least 10 mA/cm$^2$, at least 50 mA/cm$^2$ or at least 150 mA/cm$^2$. In a further embodiment, the ampacity is from at least 10 mA/cm$^2$ to 150 mA/cm$^2$. In a further embodiment, the ampacity is from at least 10 mA/cm$^2$ to 200 mA/cm$^2$. In a further embodiment, the ampacity is from at least 10 mA/cm$^2$ to 300 mA/cm$^2$.

In a further embodiment, the battery cell is fully charged at approximately 3.6 volts and the overcharge potential (electrochemical stability window) of the electrolyte is approximately 4.0 volts. In a further embodiment, the battery cell is fully charged at a voltage below the overcharge potential (electrochemical stability window) of the electrolyte.

In a further embodiment, the self discharge of the battery cell is about a five percent loss of charged capacity per month.

Furthermore, in embodiments described herein, the electrolyte is not flammable. For example, $SO_2$ is not flammable or combustible and accordingly, electrolyte embodiments containing 100 percent $SO_2$ and $LiAlCl_4$ will also be non-flammable and non-combustible. In further embodiments, amounts and types of additional ingredients of the electrolytes are provided that result in the electrolyte being non-flammable and non-combustible at predetermined temperatures and predetermined environmental conditions (e.g., the amount of oxygen to which the electrolyte is exposed).

In a further embodiment, the cells described herein are in conformance with the Projectile Test described on page 19 of Underwriter's Laboratory UL 1642 Standard for Lithium Batteries, Fourth Edition (Sep. 19, 2005), such test protocol herein incorporated by reference in its entirety. That is, when subjected to this test, no part of an exploding cell or battery shall penetrate the wire screen described in the test such that some or all of the cell or battery protrudes through the screen. In a further embodiment, when the test protocol is applied, the cells described herein will not ignite or burn out.

In a further embodiment, the electrolyte in the cells described herein will not ignite or combust when the electrolyte or the cell (that is, the cell housing) is placed above a Bunsen burner and contacted with the tip of the Bunsen burner blue flame for at least ten minutes or, alternatively, is exposed to a temperature in excess of 800° C. or a temperature of from 800° to 1000° C. for at least ten minutes.

Separator

As used herein, the term "separator" means (1) a separator, as that term is understood in the lithium ion rechargeable battery field or (2) an insulator as that term (porous insulator) is described, for example, in U.S. Patent Application Publication No. 20070065714.

Examples of insulator materials include particulate, fibrous, or tubular pore structure materials, formed, for example, from oxides, carbides, or chemically stable silicates. Further examples of insulator materials include glass fiber, e.g., woven glass or glass fleece. In a further embodiment, the insulator is inert to the electrolytes described herein and, in a further embodiment, inert to the overcharge and self discharge products of the cells described herein.

Examples of commercially available woven glass materials are listed below in Table 6.

TABLE 6

| Company Name | Product Name |
| --- | --- |
| Culimenta | HBO029 |
| Norton Pampus GmbH | 7614 |
| Stottrop Textil | Nr.124 |
| Lange + Ritter GmbH | 92125 |
| Lange + Ritter GmbH | 92140 |
| Glasseiden GmbH | TG 1000 |
| Glasseiden GmbH | TG 430 |
| Glasseiden GmbH | TG 100P |
| Interglas | 4391 |
| Interglas | 92111 |
| Interglas | 461 |
| Interglas | 2037 |
| Interglas | 2034 |
| Gröning | 2020140 |
| Gröning | 2020290 |
| Gröning | 30121060 |

In a further embodiment, the weight per unit area of the woven glass insulator is approximately 128 g/m$^2$, the warp is approximately 47.3 fibers/cm, the weft is approximately 21 fibers/cm and the thickness is approximately 0.12 mm.

Figure 6:
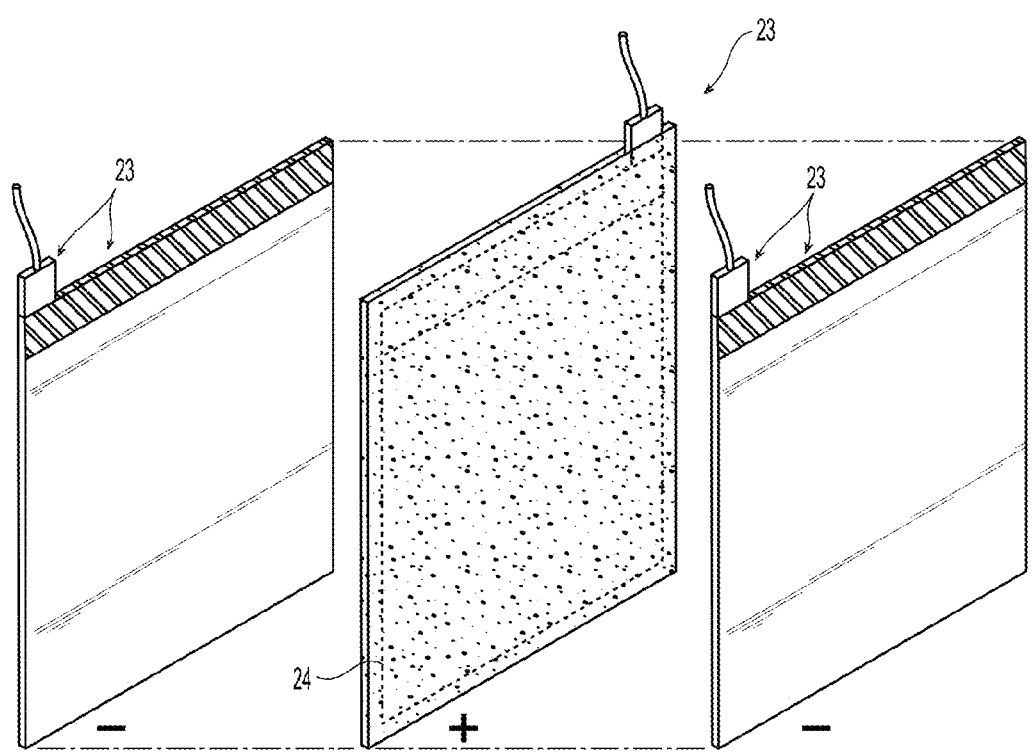
FIG. 6 shows a view of an embodiment showing a positive electrode contained in a pouch faced on each side by a negative electrode.
Figure 7:
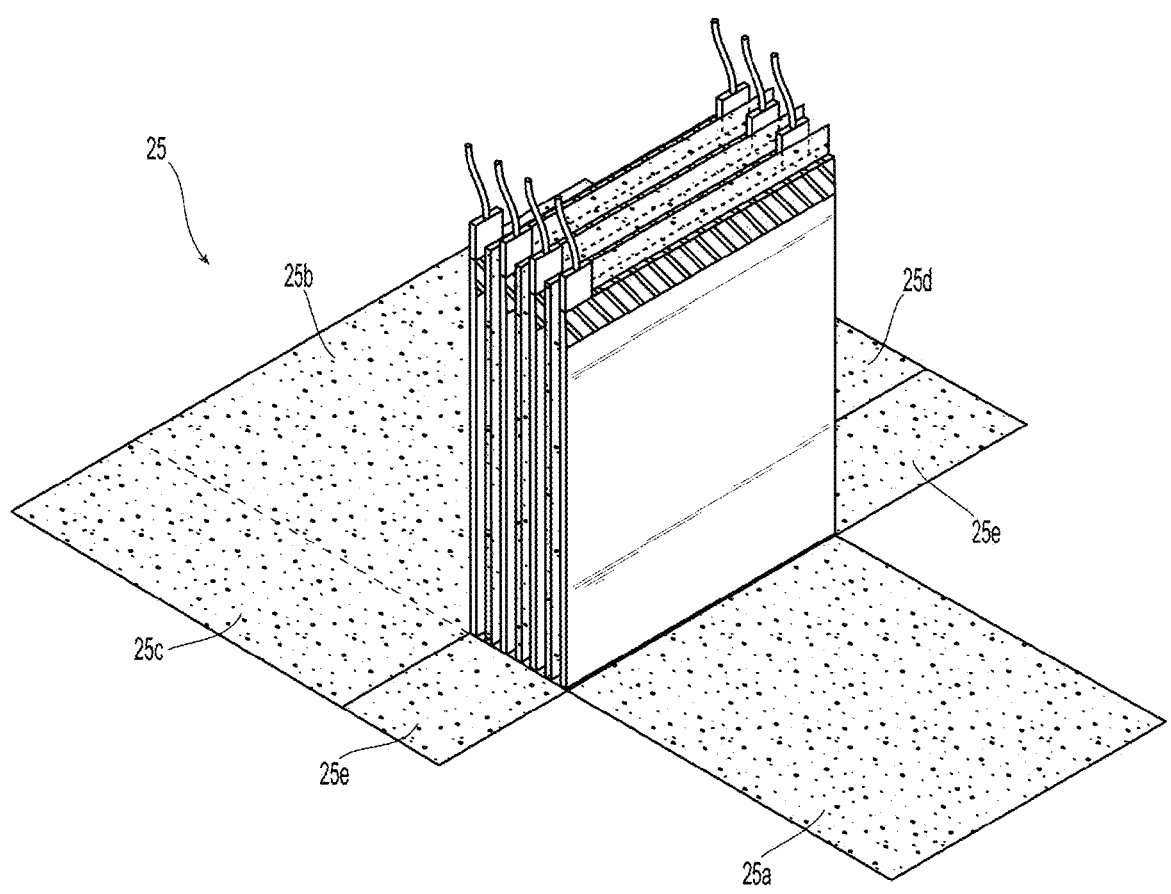
FIG. 7 shows an embodiment of a layer for covering a plurality of electrodes.

In a further embodiment, the insulator is made of woven glass and is in the form of a pouch 24, in which the positive electrode is placed (FIG. 6). In a further embodiment, as shown in FIG. 6, the top of the pouch extends up to a portion of the current collector connector 23. In a further embodiment, as shown in FIG. 6, the positive electrode in the pouch is configured between two negative electrodes. In a further embodiment as shown in FIG. 6, in this configuration, the tabs of the positive and negative electrodes are on opposite ends.

Housing

In an embodiment, the cell is located in a housing. In a further embodiment, the housing is cylindrical or prismatic. The housing is made of a durable metal, for example, stainless steel. In a further embodiment, the housing is designed to withstand the corrosive effects of the electrolytes. In a further embodiment, the housing is designed to last for more than 10 years of normal cell use.

In a further embodiment, the housing is prismatic 27 and comprises six sides, for example, four walls and a top cover 33 and a bottom cover. In a further embodiment, the top cover 33 comprises 4 ports 32, namely an electrolyte filing port, a vent port and two electrical ports.

In a further embodiment, an electrically conductive pole 28 is disposed in each electrical port, the pole being disposed in an outer peripheral surface 29 which engages the cover to occlude the port and wherein disposed between the outer peripheral surface and the pole is an insulating surface 29. In an embodiment, the foregoing is comprised in a glassto-metal feedthrough 34 which comprises an electrically conductive pole 28 disposed in a glass insulator 29, which insulates the pole from the top cover 33, wherein the insulator is disposed in an outer metal periphery surface 29 that is sealed, for example, laser welded, to the top cover 33 and the pole 28 extends through the cover 33 into the interior of the housing. In a further embodiment, the pole 28 defines an interior passage allowing communication between the inside and exterior of the housing. In a further embodiment, the pole provides electrically conductive communication between the inside and exterior of the housing but does not contain an interior passage. In a further embodiment, the pole 28 extends through the cover 33 into the interior of the housing and engages a portion of the current collector connector 23.

In a further embodiment, a plug, for example a filling tube 30, is disposed in the electrolyte filling port. In an embodiment, the plug engages the cover 33 to occlude the port and the plug defines an interior passage which allows fluid communication between the inside and exterior of the housing.

In a further embodiment, the vent port is occluded with a surface layer designed to rupture or release when exposed to a predetermined amount of pressure. In an embodiment, the surface layer is a metal burst disk, 31. In a further embodiment, the housing is hermetically sealed. In a further embodiment, the glass-to-metal feedthrough, the electrolyte filling tube and the burst disk are laser welded to the ports of the top cover and the top and bottom covers are laser welded to the walls of the housing.

Configuration of Electrodes in the Housing and Electrolyte Filling

In an embodiment, as set forth in FIG. 6, two negative electrodes are disposed on opposing sides of each positive electrode and each positive electrode is disposed in a pouch 23 that prevents the physical contact of the positive electrode to either of the negative electrodes.

In a further embodiment, a plurality of positive and negative electrodes in the above configuration are enclosed in a layer which prevents physical contact between the electrodes and the housing. In an embodiment, the layer is an envelope 25, which is folded over the electrodes. In a further embodiment, layer 25a of the envelope is folded over a negative electrode on one end of the plurality of electrodes, layer 25b of the envelope is folded over a negative electrode on the other end of the plurality of electrodes, layers 25c and 25d are folded over the exposed sides of the negative electrodes and overlap with layer 25a to cover the side edge of the negative electrode covered by 25a. In a further embodiment, layers 25e are folded over the exposed bottom edge of the negative electrodes.

Figure 8:
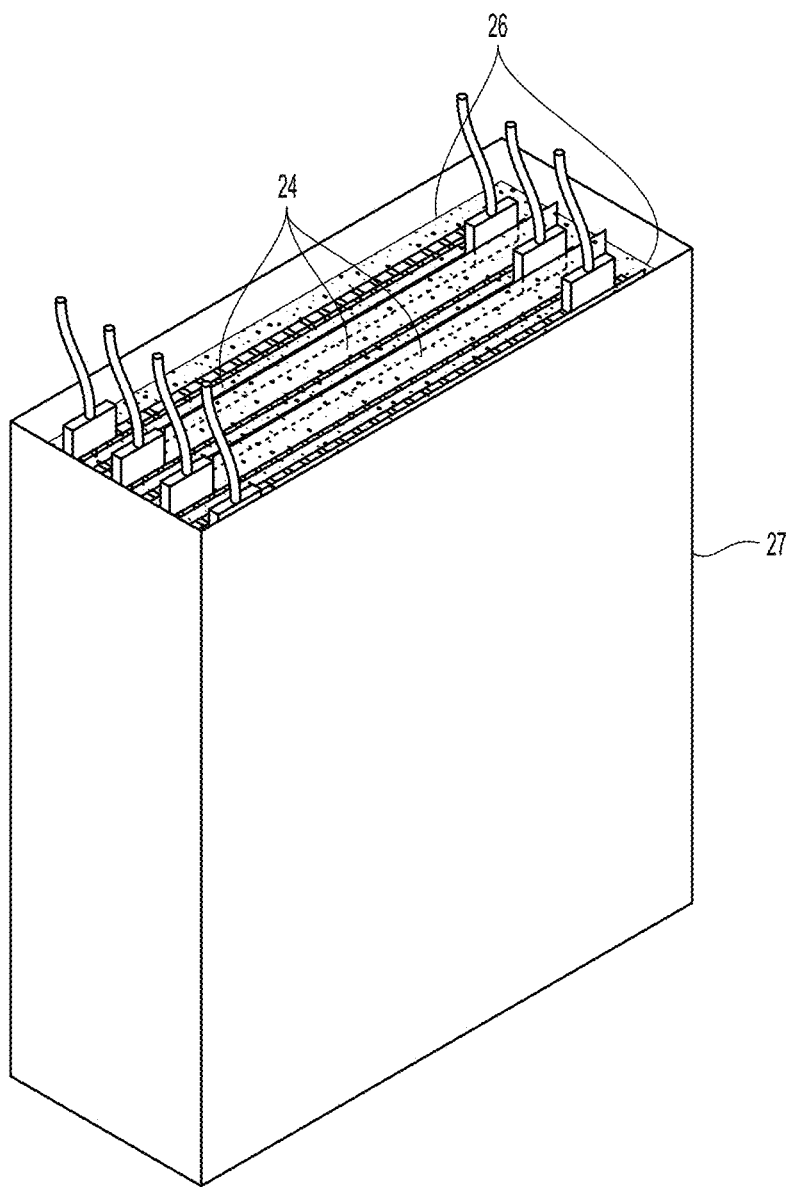
FIG. 8 shows an embodiment of a prismatic housing containing a plurality of electrodes.
Figure 9:
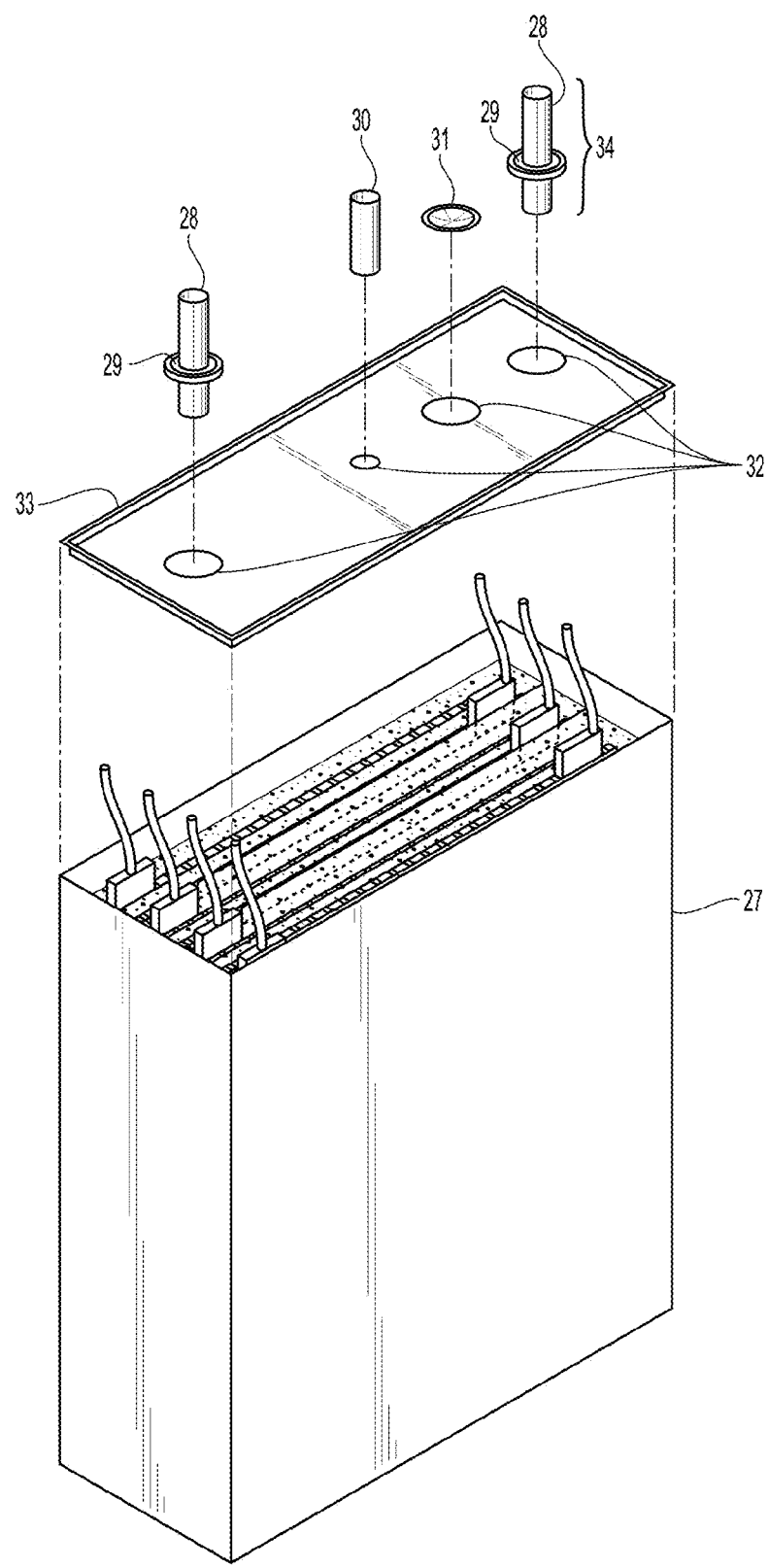
FIG. 9 shows an embodiment of a prismatic housing containing a plurality of electrodes and a top cover thereto.
Figure 10:
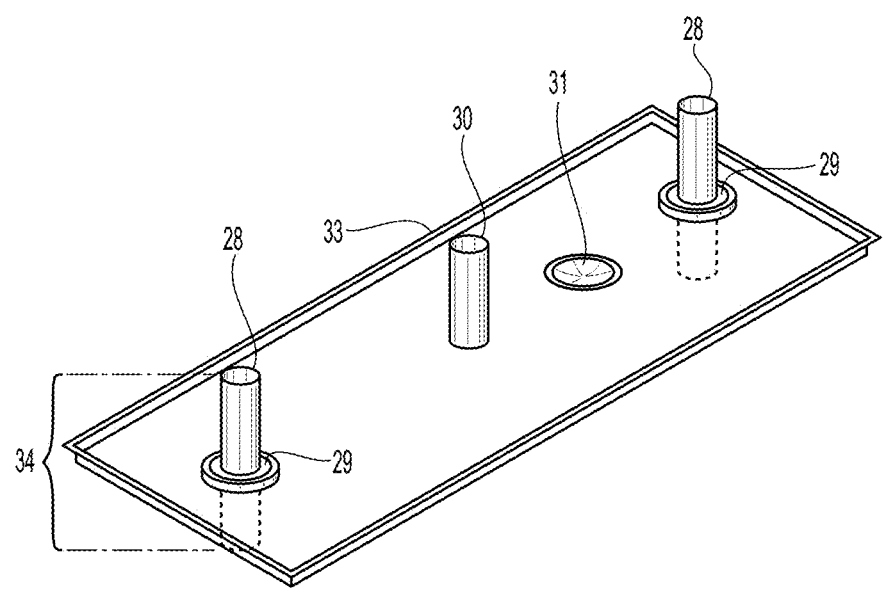
FIG. 10 shows an embodiment of the top cover of a prismatic housing.

In a further embodiment, the plurality of electrodes folded in the envelope 26 is disposed in the housing as shown in FIGS. 8 and 9. In a further embodiment, the envelope snugly fits the plurality of electrodes into the housing thereby minimizing any displacement of the positioning of the electrodes in the housing and furthermore preventing physical contact between the electrodes and the housing. In a further embodiment, the housing contains 20 positive electrodes and 21 negative electrodes.

In a further embodiment, the housing containing the plurality of electrodes folded in the envelope is filled with electrolyte via the filling tube. In an embodiment, the electrolyte rises to a level below the top of the envelopes so that the electrolyte does not directly (other than through the pouch) communicate between the positive and negative electrode.

In a further embodiment, the cell is filled with electrolyte according to processes set forth in U.S. Patent Application Publication No. 20070065714 (see for example FIG. 9 of the 20070065714 publication): In a further embodiment, 1. A cell housing containing a positive and negative electrode is evacuated;
2. The interior of the housing is filled with gaseous $SO_2$;
3. Steps 1 and 2 are optionally repeated;
4. The housing is evacuated;
5. A fill opening of the housing is attached gas-tight to a vessel which contains an electrolyte solution with a predetermined concentration of $SO_2$; and
6. The electrolyte solution is allowed to flow into the housing driven by a pressure applied to the electrolyte and by the vacuum present in the housing.

In a further embodiment, the cell is filled with electrolyte according to processes set forth in set forth below in Table 7.

TABLE 7

| In cell housing containing a plurality of electrodes: | 1. Cool the cell to −20° C. Evacuate the cell (e.g., for 10 min) with a standard vacuum. Fill the cell with gaseous 100% $SO_2$ (e.g., for ten minutes) at an over pressure of 1 bar. 4. Repeat step 2 and 3 two times. 5. Evacuate the cell. Fill the cell with electrolyte using an over pressure on the electrolyte from 1 to 2.5 bar. |
|---|---|

In a further embodiment, the dimensions of the housing, positive electrode, pouch and negative electrode are as shown in Table 8:

TABLE 8

| Component | Height (mm) | Width (mm) | Thickness (mm) |
|---|---|---|---|
| Housing | 130 mm | 130 | 24.5 |
| Positive Electrode | 106 mm (not including the height of the conductive tab) | 122.5 | 0.58 |
| Pouch | 114-118 mm | 127.5 | 0.82 |
| Negative Electrode | 110-111 mm (not including the height of the conductive tab) | 127.5 | 0.32 |

In a further embodiment, the theoretically calculated capacity of the positive electrodes in the cell is higher than that of the negative electrodes, for example, by 20-30 percent.

Cover Layer Reducing Treatment

In an embodiment, the capacity stability of a cell with at least one insertion electrode, for example, an intercalation electrode, are increased by means of a treatment or pretreatment to reduce the capacity required to create stable covering layers on at least one insertion electrode. There are various embodiments to this end.

A first embodiment is to subject the insertion electrode to a temperature treatment. This applies in particular for carbon electrodes, which are tempered at a temperature of at least 900° C. under exclusion of oxygen (for example, under inert gas) for at least 10, at least 20 and or at least 40 hours.

Alternatively or additionally, the capacity required to form stable covering layers on a negative carbon electrode can be reduced by using a graphite material with a relatively low specific surface area.

According to a further embodiment, the pretreatment to reduce the covering layers comprises providing the corresponding electrode with a thin surface coating.

Such a surface coating can be effected in particular by means of atomic layer deposition. This method has been used in recent times for numerous purposes. An overview is given, for example, in the publication, S. M. George "Atomic Layer Deposition: An Overview", Chem. Rev., 2010, 111-131.

The process parameters should be adapted to the requirements of the electrode. In an embodiment, the negative electrode is pretreated with $NO_2$-TMA (nitrogen dioxide-trimethylaluminum). This seeds an initial functional layer on the carbon, this layer being advantageous for subsequent ALD treatment. In this context, reference can additionally be made to G. M. Sundaram et al. "Leading Edge Atomic Layer Deposition Applications", ECS Transactions, 2008, 19-27.

In a further embodiment, coating by ALD is via a thin layer of $Al_2O_3$. In a further embodiment, the ALD layer is formed with $SiO_2$.

A further embodiment for applying a surface coating suitable for reducing the capacity required to establish a stable covering layers is dip coating. To this end, either the insertion active material intended for processing into the electrode or the whole electrode is brought into contact with a reaction solution that contains starting materials suitable for the formation of the layer. A temperature treatment is then performed to form and harden the layer. The following method can be used, for example.

Isopropanol, water, 1 molar hydrochloric acid and tetraethylorthosilicate are mixed in a mole ratio of 3:1:1:1. The solution is kept at room temperature. It is then diluted with isopropanol in the volume ratio 1:1. The electrodes to be treated are dipped in the reaction solution for 30 seconds or, if bubble formation is observed, until bubble formation has stopped. The electrodes are then dried in a drying cabinet at 200° C. without vacuum for 48 hours.

Embodiments of the battery cells described herein are for use in high energy applications, such as, electric vehicles, energy storage systems, including large scale energy storage system, uninterruptible power supplies, back up batteries and for certain medical devices. Further embodiments of the battery cells described herein are for use in high power applications, such as, power tools, hybrid vehicles, and certain medical devices.

In a further embodiment, battery cells described herein are used as a power supply, optionally in combination with other power supplies, and optionally as either a main or auxiliary power supply for the following: portable electronic devices such as video cameras, digital still cameras, cellular phones, notebook personal computers, cordless telephones, headphone stereos, portable radios, portable televisions and personal digital assistants (PDAs), portable home appliances such as electric shavers, memory devices such as backup power supplies and memory cards, power tools such as electric drills and electric saws, medical electronic devices such as pacemakers and hearing aids, and motor vehicles such as electric vehicles, plug in electric vehicles and hybrid vehicles.

In a further embodiment, battery cells described herein are used as an energy storage system and as a power supply for storing power from and supplying power to an energy grid.

Referring to the embodiment of FIG. 1, the housing 1 of the rechargeable battery cell 2 encloses an electrode arrangement 3 comprising a plurality (three in the case shown) of positive electrodes 4 and a plurality (four in the case shown) of negative electrodes 5. The electrodes 4, 5 are connected with corresponding terminal contacts 9, 10 of the battery by means of electrode leads 6, 7.

The electrodes 4, 5 have a planar shape, i.e., they are shaped as layers having a thickness which is small relative to their extension in the other two dimensions. They are separated from each other by separators 11. The housing 1 of the prismatic cell shown is essentially cuboid, the electrodes and the walls shown in cross-section in FIG. 1 extending perpendicularly to the drawing plane and being essentially straight and flat. However, a further embodiment of the cell can be designed as a spirally wound cell.

The electrodes 4, 5 comprise a current collector element, which is made of metal and serves to provide the required electronically conductive connection of the active material of the respective electrode. The current collector element is in contact with the active material involved in the electrode reaction of the respective electrode.

In an embodiment, during manufacture of the electrode, the active material is incorporated into the porous metal portion of the current collector such that it fills the pores of the porous metal, for example, uniformly over, for example, the whole thickness of the porous metal. The active material is then pressed under high pressure, the thickness after the pressing operation being in an embodiment, no more than 50% or no more than 40%, of the initial thickness. In a further embodiment, the active material is distributed essentially homogeneously within the porous metal. "Essentially" is to be construed such that the cell function is only slightly impaired by any deviations. In a further embodiment, the porous metal extends through at least 70% or at least approximately 80%, of the thickness of the electrode.

A portion of an electrode is shown in FIG. 3, in the form of an electron microscope image. The electrode material was cooled in liquid nitrogen and then broken, because a cutting operation would have corrupted the structural features. In spite of certain material damage caused by breaking 12, features of the structure of the portion of the positive electrode are visible in FIG. 3.

For the following Examples, positive electrodes containing $LiFePO_4$ active material were produced as follows.

A paste was produced using the following components:
94 wt. % $LiFePO_4$, with carbon surface coating and a mean particle size approximately 2-3 μm
2 wt. % carbon black as conductivity agent
4 wt. % THV as binding agent First the binding agent was dissolved in acetone, then carbon black was added to the solution while stirring, and finally the active material was added alternately with further solvent, also while stirring.

The paste was then incorporated homogeneously into nickel metal foam having an initial porosity of more than 90%, and dried for an hour at 50 C. After cooling, the electrode material was pressed by means of a calender to a thickness of 0.6 mm, starting from an initial thickness of 1.7 mm. It was then subjected to a tempering process at 180 C.

EXAMPLE 1

Pieces with a size of 1 $cm^2$ were cut out of the electrode material. The pieces had a theoretical capacity of approximately 13 mAh. The pieces were examined in an E-cell with a three-electrode arrangement, in which the reference and counter electrode were made of metallic lithium. The electrolyte used in the E-cell had the composition of 1.5 moles $SO_2$ per mole of $LiAlC_4$.

In order to determine the discharge capacities of the electrodes for different current loads, 40 charging and discharging cycles were performed in the E-cells. Charging took place in each case with the same charging rate of 1 C ("C" indicates that the nominal capacity is charged or discharged in one hour). Discharging took place after each charging operation, with the cells being discharged at the following rates in the 40 cycles:
10 cycles 1 C
4 cycles each 2 C, 4 C, 8 C, 10 C, 15 C
10 cycles 1 C.

Charging took place up to a voltage of 3.7 V. Discharging ended at a voltage of 3.2 V.

Figure 11:
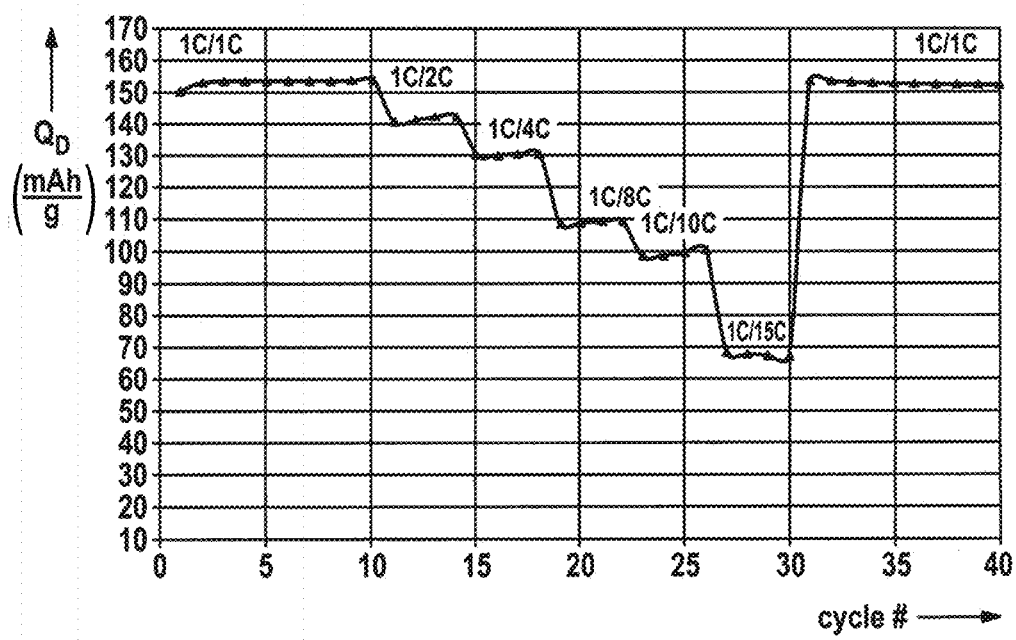
FIG. 11 shows the dependence of the discharge capacity at different discharge C-rates on the number of cycles for an experiment performed with a positive electrode.

FIG. 11 shows, as mean values over eight experiments, the discharge capacity $Q_D$ in mAh/g as a function of the cycle number. The figure shows the percentage of nominal capacity available the given discharge rates. As shown in the figure, when the cell is discharged with at 10 C, approximately two thirds of the nominal capacity is available.

Figure 12:
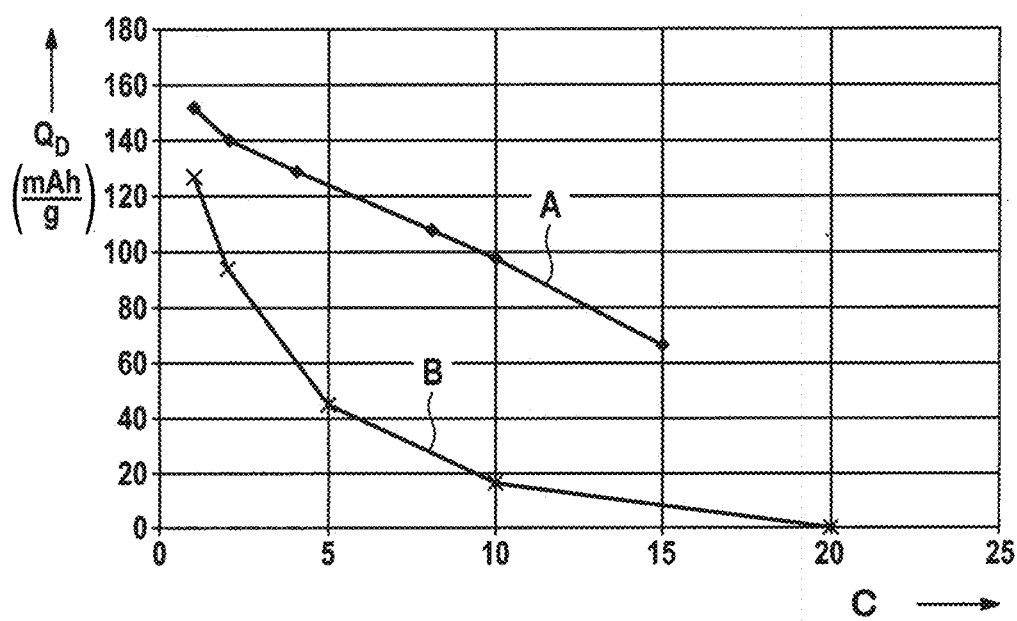
FIG. 12 shows the dependence of the discharge capacity on the discharge rate for an experiment performed with a positive electrode in comparison with published results.

FIG. 12 summarizes the results illustrated in FIG. 11, showing the discharge capacity $Q_D$ as a function of the discharge rate C (curve A). Curve B in FIG. 11 shows values from the publication, Porcher et al., "Design of Aqueous Processed Thick LiFePO4 Composite Electrodes for High-Energy Lithium Battery," *J. Electrochem. Soc.*, A 133-A144 (2009). This publication describes the production of, inter alia, electrodes having a thickness of 0.2 mm. The electrodes are manufactured with a water-soluble binding agent in aqueous suspension. The resulting capacity per unit area ("capacity density") is specified as 3 mAh/cm², with loading of 20 mg/cm² and an electrode thickness of 200 mm. The measurement data plotted in FIG. 12 was taken from FIG. 1 on Page A135 of the publication for the "CMC" material. FIG. 12 shows that the capacity represented by curve B as decreasing with the discharge rate faster than the capacity shown by Curve A. For a discharge rate of 10 C, for example, the positive electrode described in the publication and shown in Curve B has a discharge capacity of 18 mAh/g compared with 100 mAh/g for Curve A. The comparison is summarized by the following Table 9:

TABLE 9

| | Example 1 | Porcher et al. |
|---|---|---|
| Capacity per unit area (mAh/cm²) | 13 | 3 |
| Loading with active mass (mg/cm²) | 76 | 20 |
| Electrode thickness (μm) | 600 | 200 |
| Specific discharge capacity for 10 C (mAh/g) | 100 | 18 |

Figure 13:
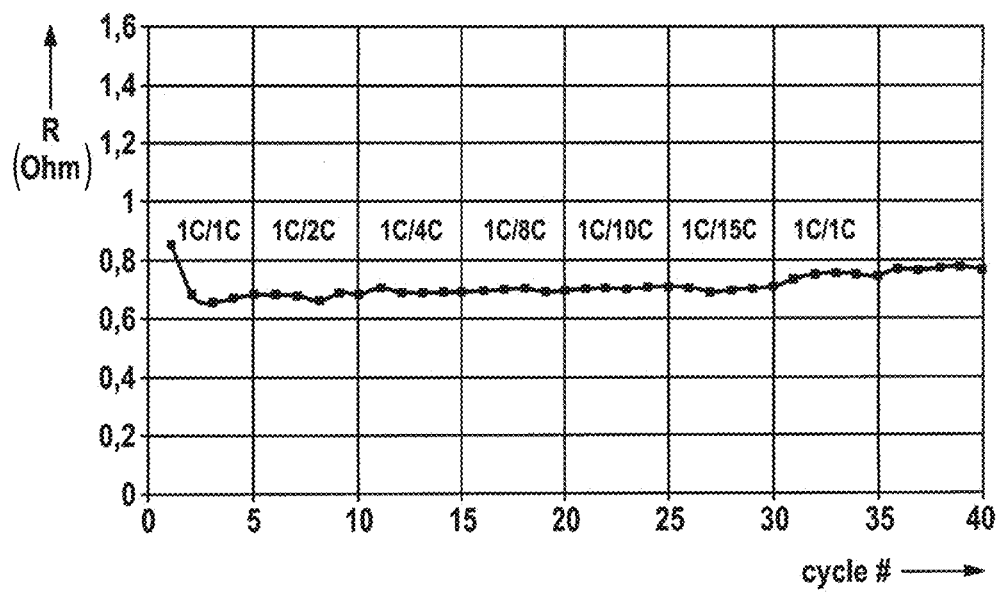
FIG. 13 shows the dependence of the electrical resistance of an electrode at different discharge C-rates on the number of cycles for an experiment performed with a positive electrode.

FIG. 13 shows the values for the resistance R of the positive electrode that were measured on the E-cells after charging, as a function of the cycle number. In spite of the discharge rates, the resistance of the electrode remains stable in the range between 0.6 and 0.8 ohms.

For the below Examples 2 and 4, the negative electrode was produced as follows. A paste was produced using 100% graphite powder. The graphite was dissolved in acetone while stirring. The paste was incorporated homogeneously into a metal foam having an initial porosity of more than 90%, and dried for an hour at 50 C. After cooling, the electrode material was pressed by means of a calender to a thickness of 0.3 mm, starting from an initial thickness of 1.7 mm. It was then subjected to a tempering process at 1000 C.

EXAMPLE 2

For this Example, a spirally wound cell of the type Sub-C was produced, the electrodes having a theoretical capacity of 17 mAh/cm² and the positive electrodes containing LiFePO4 as active material.

The electrodes were wound into a spiral together with a separator positioned between them and placed in the Sub-C housing. This was then filled with an electrolyte solution with the composition μ6SO₂ per mole LiAlCl₄. The cell was charged with a charging rate of 0.7 C to 831 mAh. The discharge current was 10 A, corresponding to a discharge rate of 7 C. Discharging was stopped at a cell voltage of 2 V and with an extracted capacity of 728 mAh. This corresponds to 88% of the charged capacity.

EXAMPLE 3

Using a positive electrode produced as set forth above and a positive electrode containing lithium cobalt oxide as the active material, but otherwise having corresponding features, the dependence of the capacity on the number of charging and discharging cycles (each with 1 C) in an E-cell was determined.

Figure 14:
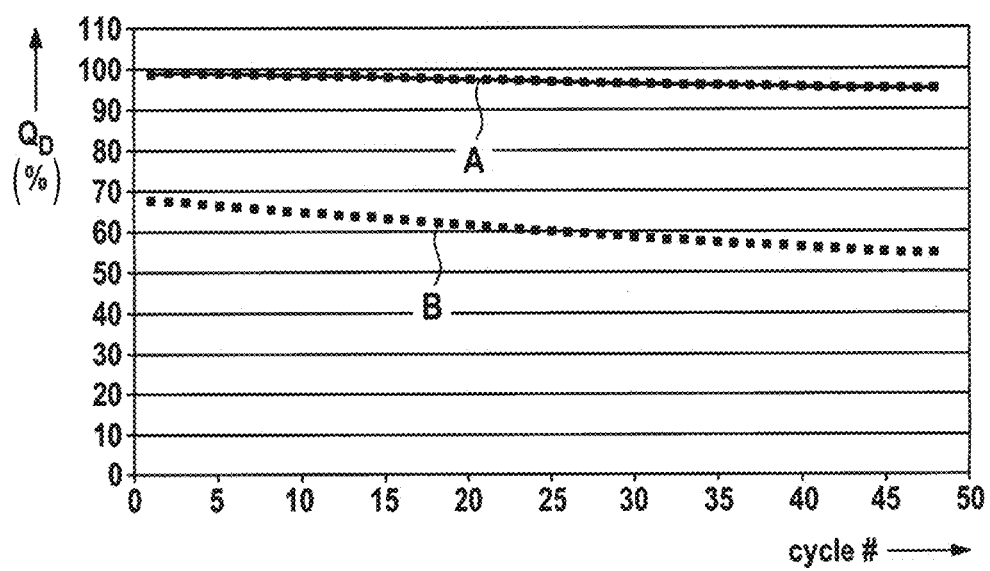
FIG. 14 shows the dependence of the capacity on the number of cycles for an experiment performed with two different positive electrodes.

FIG. 14 shows the results obtained using an SO₂ electrolyte containing 1.5 mole SO₂ per mole of conductive salt (lithium tetrachloroaluminate). The discharge capacity $Q_D$ in percent of the theoretical value is plotted against the number of charging and discharging cycles performed, where curve A relates to the LiFePO₄ electrode and curve B to the lithium cobalt oxide electrode. The curves show the amount of the theoretical capacity obtained with the LiFePO₄ electrodes, whereas on average only around 60% of the theoretical capacity is shown in curve B.

Figure 15:
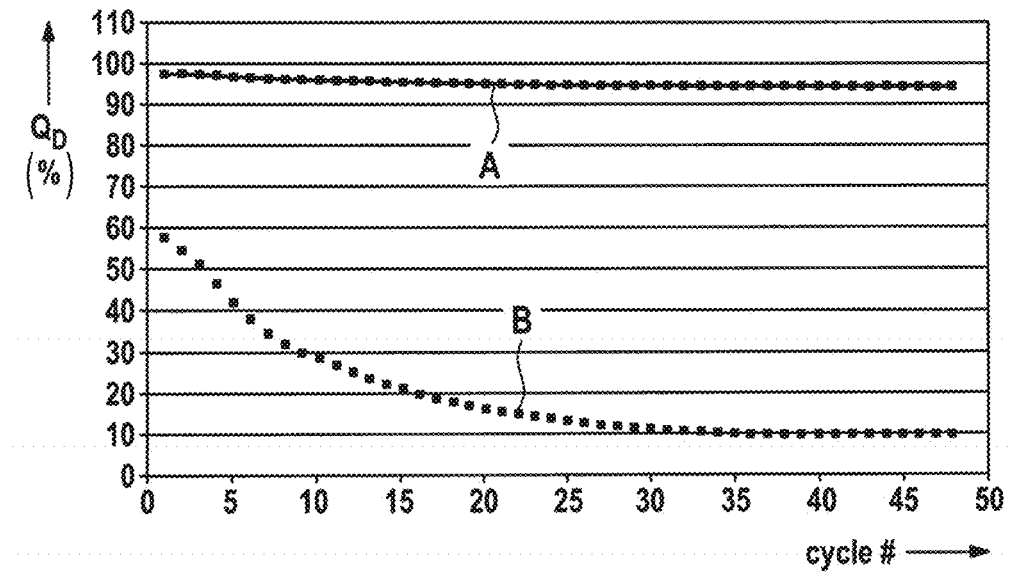
FIG. 15 shows the dependence of the capacity on the number of cycles for a further experiment performed with two different positive electrodes.

FIG. 15 shows the results of an experiment that differed from the experiment that served as a basis for FIG. 14 with respect to the concentration of the conductive salt in the electrolyte. In this case it was 4.5 mole SO₂ per mole of LiAlCl₄. The figure shows that the percent decrease in capacity for the LiFePO₄ electrode (curve A) versus the lithium cobalt oxide electrode (curve B).

EXAMPLE 4

Figure 16:
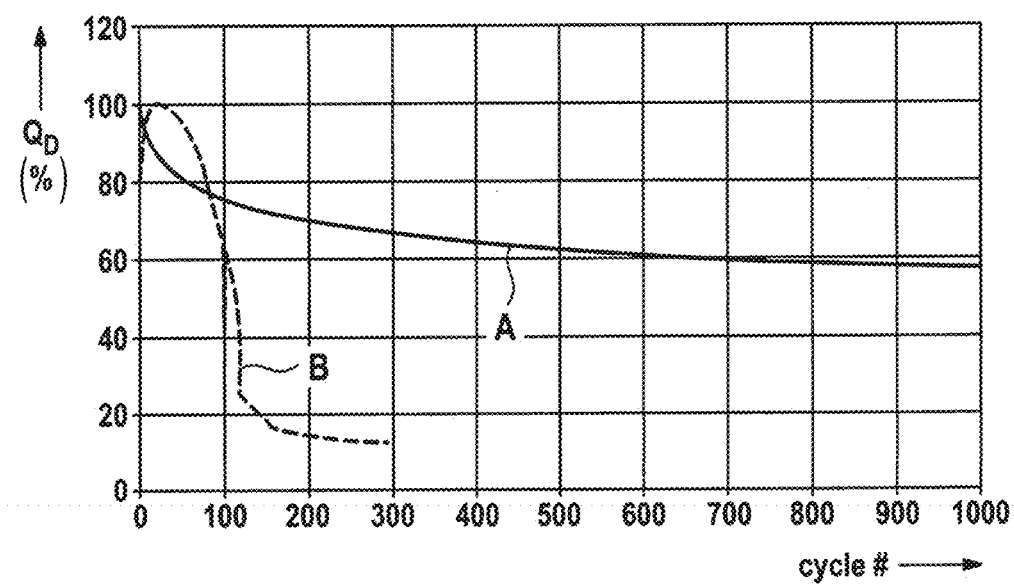
FIG. 16 shows the dependence of the discharge capacity on the number of cycles for an experiment performed with two different positive electrodes.

FIG. 16 shows the results of an experiment in an HPCM cell (two negative electrodes and one positive electrode), with the positive electrode containing LiFePO₄ with a theoretical capacity of 19 mAh/cm² (curve A), compared with a HPCM cell with a positive electrode based on lithium cobalt oxide (curves B), but otherwise having corresponding features. For both curves, the electrolyte contained 6 moles of SO₂ per mole LiAlCl₄.

The discharge capacity $Q_D$ in percent of the nominal value is plotted against the number of cycles. After an initial decrease, the extractable capacity for the cell is substantially constant versus the comparison cell.

FIG. 17 shows the results of a long-duration test with a cell of the type used in FIG. 9, curve A, where the extracted capacity $Q_D$ is again plotted against the number of cycles. The figure shows approx. 9,700 cycles, in which the reduction in the extractable capacity per 100 cycles as set forth in Table 10 below.

Table 10 shows the reduction in capacity per 100 cycles for the data shown in the curves of FIG. 16 (curve A) and FIG. 17. The increments beginning at 3100 are shown in Table 10 as 200 cycle increments but the delta is calculated based on 100 cycle increments (that is the delta is averaged over the two 100 cycle increments).

TABLE 10

| cycle number | discharge capacity (% of max. discharge capacity) | delta between 100 cycle increments |
|---|---|---|
| 100 | 75.50% | 5.70% |
| 200 | 69.80% | 3.20% |
| 300 | 66.60% | 2.30% |
| 400 | 64.30% | 1.60% |
| 500 | 62.70% | 1.50% |
| 600 | 61.20% | 1.20% |
| 700 | 60.00% | 1.00% |
| 800 | 59.00% | 0.80% |
| 900 | 58.20% | 0.50% |
| 1000 | 57.70% | 0.70% |
| 1100 | 57.00% | 0.50% |
| 1200 | 56.50% | 0.50% |
| 1300 | 56.00% | 0.50% |
| 1400 | 55.50% | 0.50% |
| 1500 | 55.00% | 0.50% |
| 1600 | 54.50% | 0.50% |
| 1700 | 54.00% | 0.30% |
| 1800 | 53.70% | 0.50% |
| 1900 | 53.20% | 0.40% |
| 2000 | 52.80% | 0.30% |
| 2100 | 52.50% | 0.30% |
| 2200 | 52.20% | 0.40% |
| 2300 | 51.80% | 0.30% |
| 2400 | 51.50% | 0.30% |
| 2500 | 51.20% | 0.40% |
| 2600 | 50.80% | 0.10% |
| 2700 | 50.70% | 0.40% |
| 2800 | 50.30% | 0.30% |
| 2900 | 50.00% | 0.20% |
| 3000 | 49.80% | 0.30% |
| 3100 | 49.50% | 0.50% |
| 3300 | 49.00% | 0.50% |
| 3500 | 48.50% | 0.50% |
| 3700 | 48.00% | 0.50% |
| 3900 | 47.50% | 0.50% |
| 4100 | 47.00% | 0.50% |
| 4300 | 46.50% | 0.50% |
| 4500 | 46.00% | 0.50% |
| 4700 | 45.50% | 0.00% |
| 4900 | 45.50% | 0.50% |
| 5100 | 45.00% | 0.30% |
| 5300 | 44.70% | 0.70% |
| 5500 | 44.00% | 0.50% |
| 5700 | 43.50% | 0.50% |
| 5900 | 43.00% | 0.50% |
| 6100 | 42.50% | 0.50% |
| 6300 | 42.00% | 1.00% |
| 6500 | 41.00% | 0.70% |
| 6700 | 40.30% | 0.50% |
| 6900 | 39.80% | 0.10% |
| 7100 | 39.70% | 0.40% |
| 7300 | 39.30% | 0.50% |
| 7500 | 38.80% | 0.63% |
| 7700 | 38.17% | 0.50% |
| 7900 | 37.67% | 2.00% |
| 8100 | 35.67% | 0.34% |
| 8300 | 35.33% | 0.50% |
| 8500 | 34.83% | 1.33% |
| 8700 | 33.50% | 0.50% |
| 8900 | 33.00% | 0.33% |
| 9100 | 32.67% | 0.67% |
| 9300 | 32.00% | 0.33% |
| 9500 | 31.67% | 0.34% |
| 9700 | 31.33% | — |

EXAMPLE 5

Figure 19:
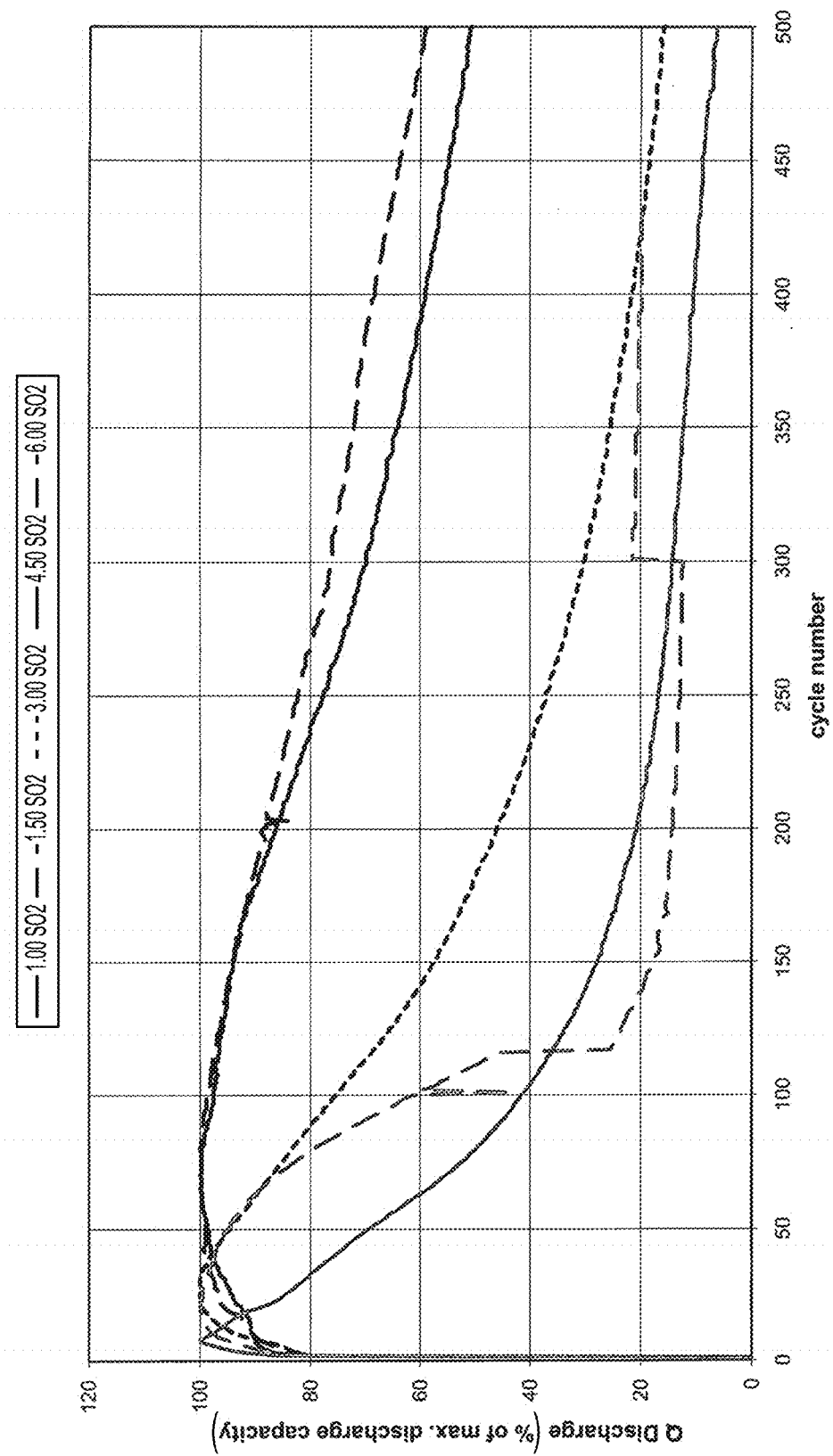
FIG. 19 shows the percent of discharge capacity versus cycle number for different molar ratios of $SO_2$ to conductive salt for $LiCoO_2$ active material.

FIG. 19 shows the percent of maximum discharge capacity versus cycle number for HPCM cells containing positive electrodes with lithium cobalt oxide as the active material and negative electrodes in accordance with the description above in an electrolyte having mole ratios of 1.0, 1.5, 3.0, 4.5, and 6.0 $SO_2$ per mole of $LiAlC_4$ and shows a decreasing trend with increasing amounts of $SO_2$ per mole of $LiAlC_4$.

Figure 20:
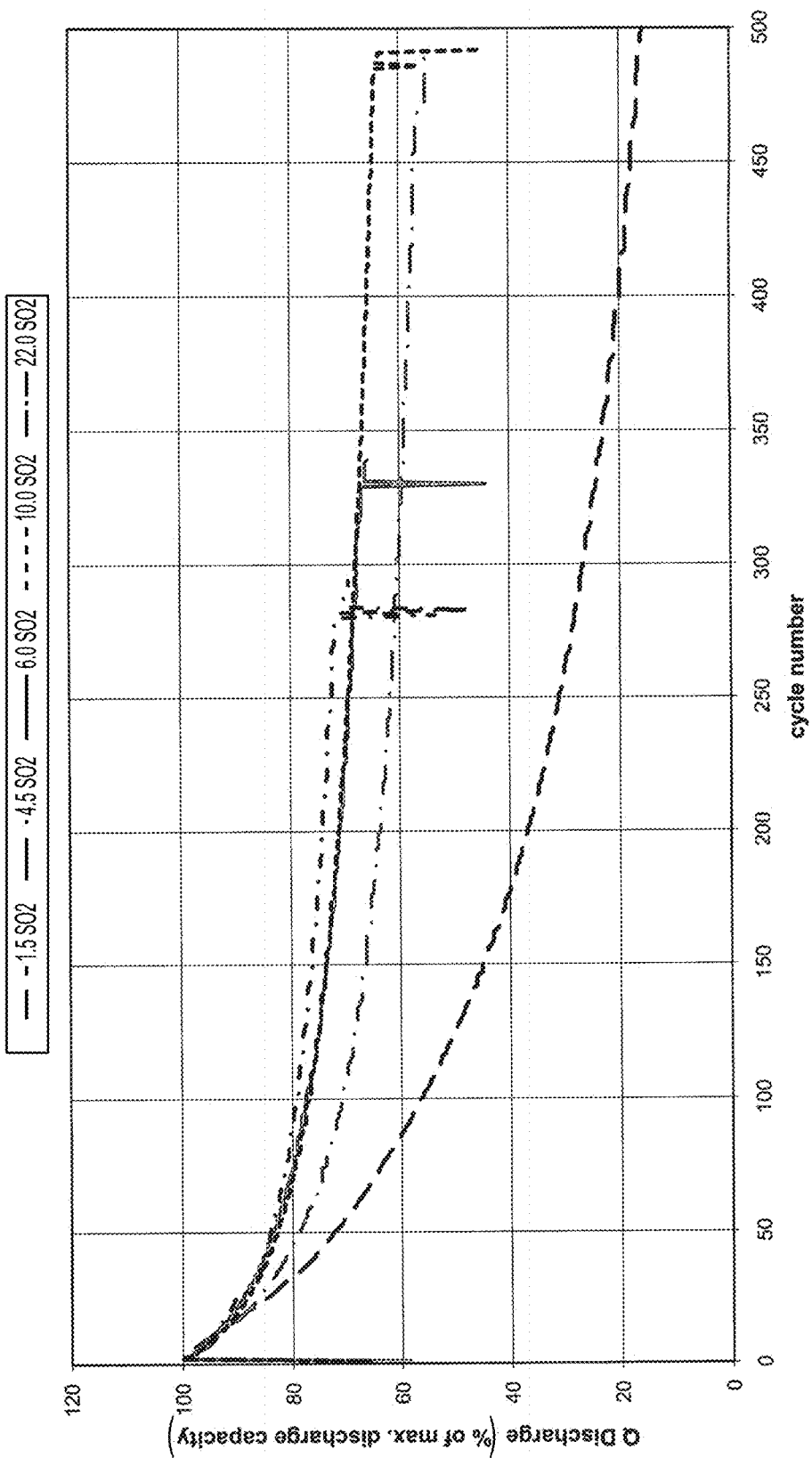
FIG. 20 shows the percent of discharge capacity versus cycle number for different molar ratios of $SO_2$ to conductive salt for $LiFePO_4$ active material.

FIG. 20 shows the percent of maximum discharge capacity versus cycle number for HPCM cells containing positive electrodes with $LiFePO_4$ as the active material and negative electrodes in accordance with the description above in an electrolyte having mole ratios of 1.5, 4.5, 6.0, 10.0 and 22.0 $SO_2$ per mole of $LiAlCl_4$ and shows an increasing and then stabilized trend as amounts of $SO_2$ per mole of $LiAlC_4$ are increased.

EXAMPLE 6

Table 11 below lists the amount of capacity consumed, based on a percentage of theoretical capacity, to form a stable SEI layer at increasing amounts of $SO_2$ per mole of $LiAlCl_4$ for cells with $LiFePO_4$ positive electrodes compared to lithium cobalt oxide positive electrodes. With both active materials, a decreased amount of capacity is consumed with the increase in $SO_2$ per mole of $LiAlCl_4$ from 1.00 to 6.00.

TABLE 11

| | SEI formation capacity (% of the theoretical capacity of the positive electrode) | |
|---|---|---|
| $SO_2$ per mole $LiAlCl_4$ | $LiCoO_2$ | $LiFePO_4$ |
| 1.00 | 23.52 | 26.96 |
| 1.50 | 21.16 | 22.58 |
| 3.00 | 21.85 | 21.52 |
| 4.50 | 18.73 | 18.94 |
| 6.00 | 15 | 16.98 |

EXAMPLE 7

Figure 18:
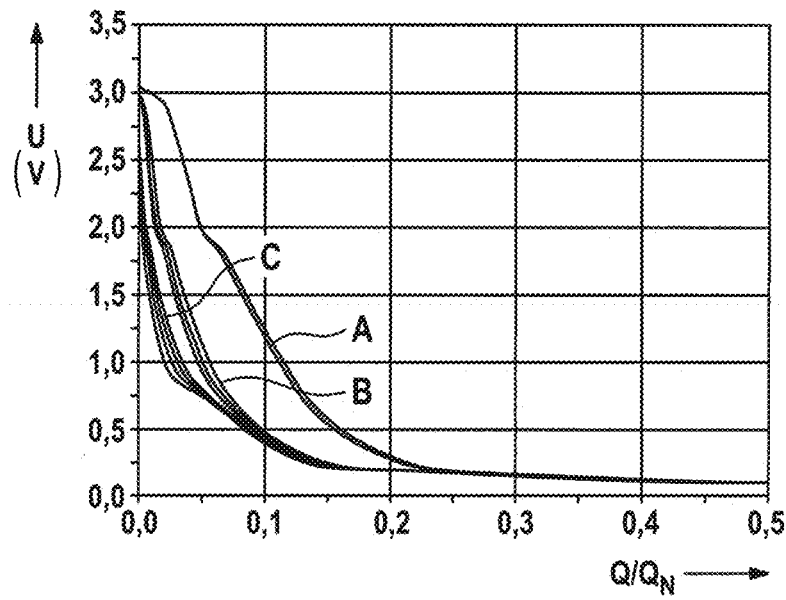
FIG. 18 shows the dependence of the electrical voltage on the charging capacity for three differently treated negative electrodes.

FIG. 18 shows the results of an experiment with the following electrode materials:
Curve A negative electrode without cover-layer-reducing pretreatment.
Curve B negative electrode where the active material was pretreated by means of dip coating with formation of an $SiO_2$ layer, before incorporation in the electrode.
Curve C negative electrode that was pretreated as a whole by means of dip coating with formation of an $SiO_2$ layer.

The three experimental electrodes were examined in an E-cell. During charging of the electrode, the voltage U against lithium was plotted in volts against the charge state Q, as fraction of the nominal capacity $Q_N$. The three graph groups illustrated show the results of several experiments in each case with the above-described electrodes. It is evident that the capacity loss for the two pretreated electrodes is less than for the untreated electrode, the electrode pretreated in its entirety being slightly better than the other pretreated electrode. It is noted that the data in Curve C has not yet been reproduced in an HPCM cell.

Battery cells with $SO_2$ electrolytes are described in the following documents which are herein incorporated by reference in their entirety, for example:
   U.S. Pat. No. 5,213,914
   WO 00/44061 and U.S. Pat. No. 6,709,789
   WO 00/79631 and U.S. Pat. No. 6,730,441
   WO 2005/031908 and U.S. 2007/0065714
   L. Zinck et al. "Purification process for an inorganic rechargeable lithium battery and new safety concepts," J. Appl. Electrochem., 2006, 1291-1295

WO 2008/058685 and US Patent Application 2010/0062341

WO 2009/077140

What is claimed is:

1. A rechargeable lithium ion battery cell, comprising:
a housing, a positive electrode, a negative electrode and an electrolyte, wherein the electrolyte comprises $SO_2$ and a conductive salt and contains less than 50% by weight of organic material:
wherein the positive electrode comprises a quantity of active material per unit area of at least 30 mq/cm2;
wherein the positive electrode comprises a compound of the formula $Li_xM'_y(XO_4)_aF_b$ (I), which compound is optionally doped, wherein
M' is at least one metal selected from the group consisting of the elements Ti, V, Cr, Mn, Fe, Co, Ni, Cu and Zn,
X is selected from the group consisting of the elements P, Si and S,
x is greater than 0,
y is greater than 0,
a is greater than 0 and
b is greater than or equal to 0, and
wherein the sum of positive charges in the compound equals the sum of negative charges.

2. The battery cell according to claim 1, wherein the positive electrode further comprises a current collector having a first portion comprising a porous metal which has first and second surfaces and a thickness extending between the first and second surfaces, the porous metal comprising a plurality of pores extending at least partially through the thickness and containing the compound, wherein at least some of the pores have void spaces accessible to the electrolyte.

3. The battery cell of claim 2, wherein the plurality of pores further contains at least one of a conductive agent, a binding agent, and a lithium halogenide.

4. The battery cell of claim 2, wherein at least some of the pores extend through the entire thickness.

5. The battery cell of claim 2, wherein the current collector further comprises a second portion in conductive contact with the first portion, the second portion comprising a connector.

6. The battery cell of claim 1, wherein the positive electrode has a thickness of at least 0.25 mm.

7. The battery cell of claim 1, wherein the positive electrode has a thickness of from 0.25 mm to 1.0 mm.

8. The battery cell according to claim 1, wherein the positive electrode comprises a quantity of active material per unit area of from 30 $mg/cm^2$ to 180 $mg/cm^2$.

9. The battery cell according to claim 8, wherein the positive electrode comprises a binding agent in an amount of no more than 10 wt. % of the active material.

10. The battery cell according to claim 1, wherein the positive electrode is porous and has a porosity of no more than 50%.

11. The battery cell according to claim 1, wherein the negative electrode has a thickness of at least 0.2 mm.

12. The battery cell according to claim 1, wherein the negative electrode has a thickness of from 0.2 mm to 0.8 mm.

13. The battery cell according to claim 1, wherein the negative electrode comprises carbon for inserting lithium ions.

14. The battery cell according to claim 1, wherein the negative electrode comprises a quantity of active material per unit area of at least 10 $mg/cm^2$.

15. The battery cell according to claim 1, wherein the negative electrode comprises a quantity of active material per unit area of from 10 $mg/cm^2$ to 100 $mg/cm^2$.

16. The battery cell according to claim 1, wherein the negative electrode is porous and its porosity is no more than 50%.

17. The battery cell according to claim 1, wherein the negative electrode comprises a porous metal portion and binding agent contained therein and the binding agent is in an amount of no more than 5 wt. % of the weight of the porous metal portion of the negative electrode.

18. The battery cell according to claim 1, wherein the cell discharge capacity does not decrease by more than 25 percent between the $100^{th}$ and $350^{th}$ cycles of charging and discharging.

* * * * *

UNITED STATES PATENT AND TRADEMARK OFFICE
CERTIFICATE OF CORRECTION

PATENT NO. : 9,972,864 B2  
APPLICATION NO. : 14/880807  
DATED : May 15, 2018  
INVENTOR(S) : Laurent Zinck et al.

It is certified that error appears in the above-identified patent and that said Letters Patent is hereby corrected as shown below:

In the Claims

Claim 1, Column 27, Line 11, the phrase "at least 30 mq/cm2" should read --at least 30 $mg/cm^2$--.

Signed and Sealed this  
Twenty-sixth Day of June, 2018

Andrei Iancu  
*Director of the United States Patent and Trademark Office*